US006339629B1

(12) United States Patent
Takeuchi et al.

(10) Patent No.: US 6,339,629 B1
(45) Date of Patent: *Jan. 15, 2002

(54) SYSTEM FOR MONITORING POWER OF NUCLEAR REACTOR

(75) Inventors: Yutaka Takeuchi, Tochigi; Shigeru Kanemoto, Yokohama; Mitsuhiro Enomoto, Kawasaki; Shiho Miyamoto, Yokohama, all of (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/203,532

(22) Filed: Dec. 1, 1998

(30) Foreign Application Priority Data

Dec. 1, 1997 (JP) .............................................. 9-347120

(51) Int. Cl.$^7$ ............................................ G21C 17/108
(52) U.S. Cl. ........................ 376/254; 376/245; 376/215; 376/217; 376/255
(58) Field of Search ................................ 376/215, 216, 376/217, 238, 242, 254, 255, 245

(56) References Cited

U.S. PATENT DOCUMENTS 5,406,598 A * 4/1995 Takeuchi et al. ............. 376/254
5,555,279 A * 9/1996 Nir et al. ...................... 376/216

FOREIGN PATENT DOCUMENTS

JP          6201884     * 11/1995
SE          2931886     *  9/1993

OTHER PUBLICATIONS

Y. Takeuchi, et al., (III) Nuclear Technology, vol. 105, No. 2, pp. 162–183, "TRACG Transient Analysis Code–Three–Dimensional Kinetics Model Implementation and Applicable for Space–Dependent Analysis", Feb. 1994.

Y. Takeuchi, et al., (IV) Nuclear Technology, vol. 106, No. 3, pp. 300–314, "A Study on Boiling Water Reactor Regional Stability from the Viewpoint of Higher Harmonics", Jun. 1994.

Nuclear Reactor engineering, Glasstone and Sesonske, Van Norstrand 1967, section 4.35, pp. 164–165.*

* cited by examiner

*Primary Examiner*—Michael J. Carone
*Assistant Examiner*—John Richardson
(74) *Attorney, Agent, or Firm*—Oblon, Spivak, McClelland, Maier & Neustadt, P.C.

(57) ABSTRACT

In a system for monitoring power of a nuclear reactor, a plurality of neutron flux measuring devices are arranged in a reactor core of the nuclear reactor for measuring neutron flux so as to generate neutron flux signals on the basis of the measured neutron flux. The neutron flux signals are filtered through a first weighting coefficient and a second weighting coefficient previously held in a monitoring signal calculating unit so as to generate stability monitoring signals. The first weighting coefficient corresponds to a fundamental mode of a neutron flux distribution in the reactor core and tire second weighting coefficient corresponds to a higher mode of the neutron flux distribution therein. The stability monitoring signal filtered through the first and second weighting coefficients are transmitted to a stability monitoring unit the stability monitoring unit monitors the stability of the core according to the transmitted stability monitoring signals.

24 Claims, 21 Drawing Sheets

- LPRM
○ FUEL ASSEMBLY
□ CONTROL ROD

ACTUAL CIRCUMFERENTIAL PRIMARY MODE DISTRIBUTION

BESSEL FUNCTION DISTRIBUTION

- ● LPRM
- ◉ LPRM FOR MONITORING CORE STABILITY
- ⊘ LPRM FOR MONITORING REGIONAL STABILITY

SYSTEM FOR MONITORING POWER OF NUCLEAR REACTOR

BACKGROUND OF THE INVENTION

1. Field of the Invention

The present invention relates to a system for monitoring power of a nuclear reactor and a power distribution thereof.

In particular, the present invention relates to the system for monitoring the power of the nuclear reactor, which is used for monitoring an oscillation of a power of a boiling water reactor.

2. Description of the Prior Art

A boiling water reactor (hereinafter, referred simply to as BWR) such as a light water reactor is provided with a reactor core instrumentation system having an arrangement in which multiple neutron flux detection devices, as plural neutron measuring means, is disposed in the core for detecting neutron flux so that the nuclear instrumentation system monitors power of the reactor and power distribution in axial and radius direction of the reactor core according to the detected neutron flux in an operational state of the BWR.

One neutron flux detection device is arranged in each of the 16 fuel assemblies in the reactor core of the BWR. Each neutron flux detection device has four neutron flux detectors disposed along a vertical direction thereof. Each of the neutron flux detectors are called as a local power range monitor (LPRM). For example, in a reactor core of a 1100 MWe BWR, 172 (=43×4) channel neutron flux detectors are disposed.

A power signal (LPRM signal) from each neutron flux detector is averaged every about 20 signals by an average power range monitor (APRM). For example, the 1100 Mwe BWR has 6 channels of the average power range monitors so that 6-channel APRM signals are outputted therefrom. All of these APRM and LPRM signals are analog signal.

In the conventional BWR, the APRM signal from the average power range monitor is monitored, and when the APRM signal gets to reach to no less than a predetermined value (predetermined point), a trip signal such as a scram signal is outputted so that the nuclear reactor is not prevented from operating in a dangerous state in response to the trip signal, and is stably operated.

In particular, in the conventional BWR, for avoiding an unstable phenomenon in a power of a reactor core, an operating limit range is previously set so as to avoid an operation of the nuclear reactor in the operating limit range. In a case where the reactor is operated in the operating limit range, the measures, in which a previously selected control rod is inserted so as to lower the power of the nuclear reactor whereby the operation of the nuclear reactor gets away from the operating limit range, are taken.

The operating limit range of the nuclear reactor is previously computed from a result of stability analysis using an analysis code by a process control computer. Recently, there has been developed a stability monitor which can continuously evaluate a stability of the power of the reactor core on the basis of vacillating of the signals (LPRM signals) in the reactor core detected by the neutron flux detector.

However, since the conventional stability monitor makes only an evaluation of stability with the use of the averaged APRM signal and an evaluation of individual LPRM signals, it is impossible to accurately make an evaluation of stability in a power oscillation of the nuclear reactor. The stability in the power oscillation of the nuclear reactor depends upon a complicate space dependency in the reactor core, and is recently observed in many foreign atomic power plants.

Since the APRM signal in averaged equally by each of the LPRM signals, in case where the power of the nuclear reactor oscillates in the whole of the reactor core, it is possible to detect a power distribution of the reactor core. However, in a case where the power of the nuclear reactor locally oscillates in the reactor core, or in a case where the power thereof oscillates while having a spatial phase difference in the reactor core, each of quantities of the oscillations included in each of the LPRM signals is offset so as to be absorbed in each other due to averaging the LPRM signals, thus, there is the possibility that it is difficult to detect the power distribution of the reactor core.

As an example of the oscillation of the power of the nuclear reactor at local areas in the reactor core, there is an oscillation phenomenon of a density wavy oscillation generated from fuel assemblies which are thermal-hydraulically strict and have high-power, respectively, said oscillation phenomenon being called as a channel oscillation phenomenon. Even if the oscillation phenomenon is diffused by a neutron flux oscillation, there is the possibility that the oscillation phenomenon is adapted to oscillate in a relatively only narrow range.

Further, as an example of causing the oscillation of the nuclear reactor having the spatial phase difference, there is an oscillation phenomenon which is called as a regional oscillation such that the power signals are mutually oscillated with a 180° phase difference at a symmetrical position in the reactor core. This oscillation phenomenon is actually observed in some foreign atomic power plants. For example, in a regional oscillation observed in a CAORSO plant in Italy, the largest amplitude of the APRM signal is, at most, a degree of approximately 10%; on the contrary, the largest amplitude of the LPRM signal reaches 60% is observed. This results from the following reason in which the power signals corresponding to the LPRM signals are mutually oscillated (vibrated) with a 180° phase difference at each half portion of the reactor core so that maximum values of the LPRM signals and minimum values thereof are simultaneously averaged so as to be canceled.

In a case of monitoring a stability of the reactor core, usually, a damped wave ratio indicative of stability, a cycle of the oscillation, an amplitude thereof and the like are computed from the APRM signal, whereby the stability of a state of the reactor core is estimated.

However, in the case where the regional oscillation is generated, even if the only APRM signal is monitored, there is the possibility that it is impossible to accurately detect the stability of the reactor core.

Further, in a system for monitoring a stability of a nuclear reactor, some LPRM signals at different portions in the reactor core are selected so that, by using the selected LPRM signals, the estimation operation of the stability of a state of the reactor core is carried out in the same manner as the APRM signal. However, since a logic for processing a plurality of LPRM signals and for carrying out a decision operation is not decided, the estimation operation of the system is not used for detecting the stability of the reactor core in a case where the regional oscillation is generated.

The applicants of the present invention have proposed the following methods (see the specification of U.S. Pat. No. 5,406,598 and Japanese Non-examined Patent Publication No. 6-201884) to solve the above problem that it is impossible to accurately detect the stability of the reactor core, while the regional oscillation is generated. One to a method of previously selecting reference LPRM signals on the basis of a variance value of a signal, and successively calculating phase differences and amplitude differences between the selected LPRM signals, so as to generate the neutron flux detection signal having a high sensitivity by using the phase differences and the amplitude differences of the LPRM signals as compared with averaging LPRM signals equally. The other is a method of previously estimating a spatial higher mode distribution having the possibility of oscillation, thereby, in a case of averaging the LPRM signals, using the estimated distribution mode as a weighting filter.

SUMMARY OF THE INVENTION

The present invention is directed to overcome the foregoing problems. Accordingly, it is one object of the present invention to provided a system for monitoring power of a nuclear reactor, which can accurately monitor an oscillation of the power of the nuclear reactor by using conventional detection signals such as LPRM signals so as to improve the safety of the nuclear reactor and the availability thereof.

Another object of the present invention is to improve the power monitoring method already proposed by the applicants into an online power monitoring method which monitors the power of the nuclear relator in an online state and to provide a system for monitoring the power of the nuclear reactor, which is capable of monitoring an oscillation of the power of the nuclear reactor overlooked in a case of using the conventional power monitoring method.

In order to achieve the such objects and other objects, according to one aspect of the present invention, there is provided a system for monitoring power of a nuclear reactor, comprising: a plurality of neutron flux measuring means arranged in a reactor core of the nuclear reactor for measuring neutron flux so as to generate neutron flux signals on the basis of the measured neutron flux; generating means having a first weighting coefficient and a second weighting coefficient for filtering the neutron flux signals through at least one of the first weighting coefficient and the second weighting coefficient so as to generate a stability monitoring signal, said first weighting coefficient corresponding to a fundamental mode of a neutron flux distribution in the reactor core and said second weighting coefficient corresponding to a higher mode of the neutron flux distribution therein; and stability monitoring means for monitoring a stability of the reactor core according to the stability monitoring signal generated by the generating moans.

In preferred embodiment of this aspect, the reactor core has a substantially homogeneity and wherein said first weighting coefficient and said second weighting coefficient are obtained by using a Bessel function distribution substantially corresponding to a neutron flux distribution of the homogeneous reactor core.

This aspect of the present invention has an arrangement that the generating means is adapted to generate a first stability monitoring signal as the stability monitoring signal by filtering the neutron flux signals through the first weighting. coefficient so as to supply the first stability monitoring signal to the stability monitoring means, and wherein said stability monitoring means has means for gaining a decay ratio related to the first stability monitoring signal, a resonant frequency concerning thereto and an amplitude related thereto and means for evaluating a core stability of the reactor core as the stability thereof according to the decay ratio, the resonant frequency and the amplitude.

This aspect of the present invention has an arrangement that the generating means is adapted to generate a second stability monitoring signal as the stability monitoring signal by filtering the neutron flux signals through the second weighting coefficient so as to supply the second, stability monitoring signal to the stability monitoring means, and wherein said stability monitoring means has means for gaining a decay ratio related to the second stability monitoring signal, a resonant frequency concerning thereto and an amplitude related thereto and means for evaluating a regional stability of the reactor core as the stability thereof on the basis of the decay ratio, the resonant frequency and the amplitude.

Preferred embodiment of this aspect further comprises: measuring and recording means for successively measuring core state data representing a present state in the reactor core according to the neutron flux signals so as to record the core state data; input means for inputting a given operating point of the nuclear reactor having a predetermined operating condition thereof; means for reading out the core state data from the measuring and recording means in response to the input of the given operating point; means for obtaining a thermal-hydraulic prediction condition at the given operating point on the basis of the predetermined operating condition and the read-out core state data; and stability predicting means having a stability analysis model based on a physical model for carrying out a stability analysis by using the thermal-hydraulic prediction condition at the given operating point and the stability analysis model so as to predict a core stability, a channel stability and a regional stability of the reactor core at the given operating point.

In order to achieve the such objects and other. objects, according to another aspect of the present invention, there is provided a system for monitoring power of a nuclear reactor, comprising: a plurality of neutron flux measuring means arranged in a reactor core of the nuclear reactor for measuring neutron flux so as to generate neutron flux signals on the basis of the measured neutron flux, a part of said neutron flux measuring means being disposed to peripheral portions in the reactor core so as to be substantially at equal distance from a center portion of the reactor core; generating means having at least one weighting coefficient for filtering the neutron flux signals through the at least one weighting coefficient so as to generate a stability monitoring signal; and stability monitoring means for monitoring a regional stability of the reactor core according to the stability monitoring signal generated by the generating means.

As is evident from the above descriptions, the system of the present invention can accurately monitor the power oscillation of the nuclear reactor, which is hard to be detected by the conventional APRM signals, and can achieve an improvement in safety and availability factor of the nuclear reactor.

BRIEF DESCRIPTION OF THE DRAWINGS

Other objects and aspects of the present invention will become apparent from the following description of an embodiment with reference to the drawings in which.

DETAILED DESCRIPTION OF THE PREFERRED EMBODIMENTS

An embodiment of a system for monitoring power of a nuclear reactor according to the present invention will be described hereinafter with reference to the accompanying drawings.

Figure 1:
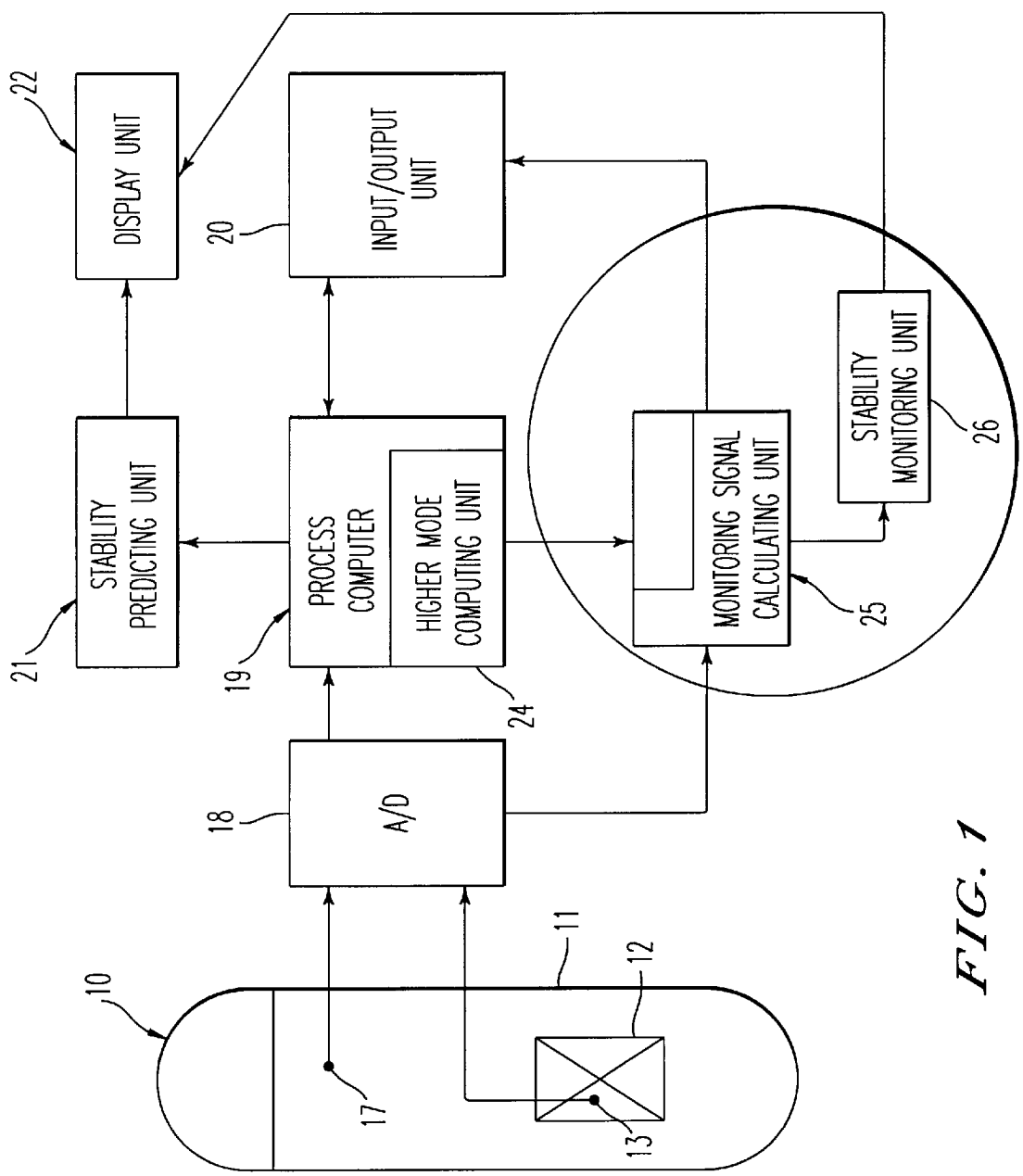
FIG. 1 is a block diagram showing a construction of a system for monitoring power of a nuclear reactor according to an embodiment of the present invention.

FIG. 1 is a block diagram showing a whole construction of the system for monitoring power of the nuclear reactor (hereinafter, referred to as a monitoring system) according to the present invention. In FIG. 1, a reference numeral 10 represents a boiling water reactor (BWR) such an a light water reactor. Hereinafter, the BWR 10 is referred to simply as reactor. The reactor 10 has a reactor pressure vessel 11 and a reactor core 12 housed in the reactor pressure vessel 11. The reactor core (referred to simply as core) 12 is provided with a plurality of neutron flux measuring (detecting) devices 13 which operates as neutron flux measuring means.

Figure 2:
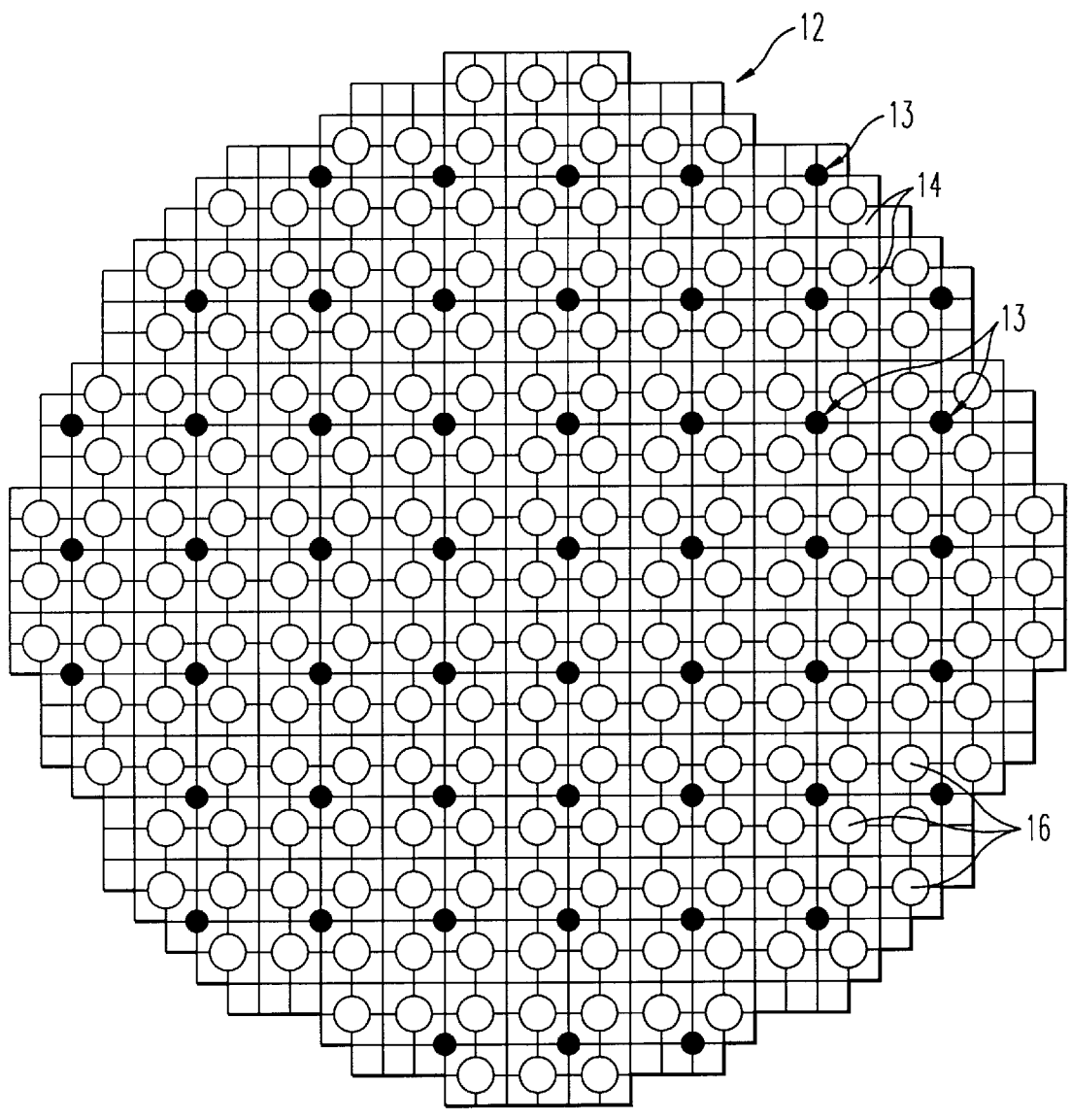
FIG. 2 is a brief cross sectional view showing a reactor core of the nuclear reactor shown in FIG. 1 and an arrangement of neutron flux measuring devices provided in the reactor core.
Figure 3:
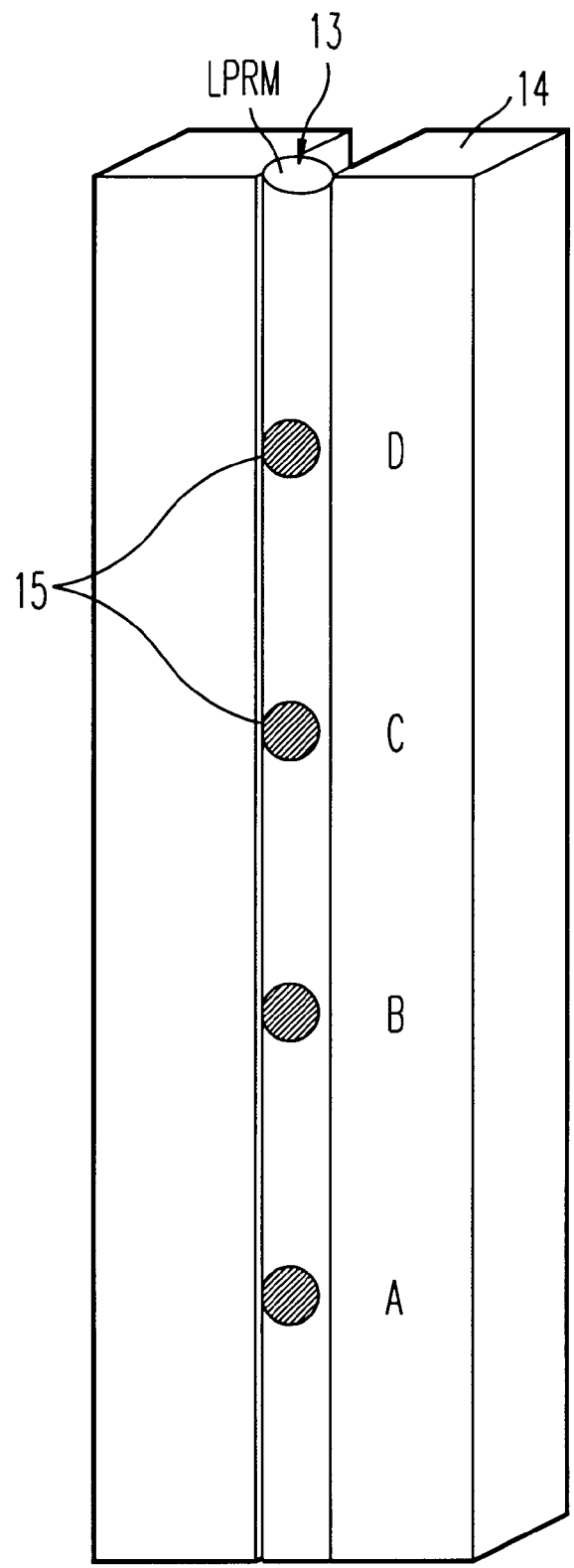
FIG. 3 is an axial arrangement view showing sectional view showing an arrangement of neutron flux detectors shown in FIG. 2 and disposed in an axial direction (vertical direction) of the reactor core.

As shown in FIG. 2, each of the neutron flux measuring devices 13 is arranged in the core 12 in a ratio of one to sixteen fuel assemblies 14, as a reactor nuclear instrumental system so as to monitor power of the reactor 10 and a power distribution in an axial direction of the core 12 and in a radius direction thereof when the reactor 10 is operated, and to make a nuclear instrumentation. For example, a 1100 MWe BWR has the core in which 43 neutron flux measuring devices 13 are disposed. As shown in FIG. 3, each neutron flux measuring device 13 is provided with four neutron flux detectors 15 each of which operates as a local power regional monitor (LPRM) along a vertical direction in parallel with an axial direction of the fuel assembly 14. These four neutron flux detectors 15 are generally called as A, B, C and D when viewed from a lower side of the fuel assembly 14. Incidentally, in FIG. 2, a reference numeral 16 represents a control rod for adjusting and controlling nuclear fission reaction in the reactor 10.

The core 12 of the reactor 10 1a usually has 100 or more neutron flux detectors 15. For example, the 1100 MWe BWR has the core in which 172 channels (=43×4 channels) of neutron flux detectors are arranged. A power signal having an analog value as an LPRM is outputted (taken out) from each neutron flux detector 15.

The LPRM signals from the neutron flux detectors 15 are inputted in an average power range monitor (APRM). The LPRM signals are sectioned into groups each consisting of substantially 20 signals by the APRM so that the respective groups of the LPRM signals are equally averaged to be formed into APRM signals, respectively.

Further, as shown in FIG. 1, the reactor 10 includes a core state data measuring device 17. The core state data measuring device 17 is operative to measure core operation state signals (measurement signals of quantities of plant state) representing state data (process data) of the core 12. That is, the core operation state signals include, for example, the quantity of the state except for the power of the core 12, the quantity of the flow of a coolant, the temperature of the coolant, the pressure thereof, the quantity of the insertions of the control rods and other similar process data. The core operation state signals are also analog signals.

These analog signals including the LPRM signals outputted from each neutron flux detector 15 of the neutron flux measuring device 13, the core operation state signals outputted from the core state data measurement device 17 and the APRM signals outputted from the APRM are inputted to an analog-to-digital converter (A/D converter) 18. The A/D converter 18 is operative to carry out data sampling operation so as to extract instantaneous values from each of the analog signals including each LPRM signal, each core operation state signal and each APRM signal. The A/D converter 18 is also operative to convert the instantaneous values into digital data.

The digital data converted from at each LPRM signal are outputted as neutron flux data to a process control computer (process computer) 19 having, for example, operation of calculating a neutron flux distribution and a monitor signal calculating unit 25. The digital data converted from the core operation state signals are outputted as core state data to the process computer 19 and the monitor signal calculating unit 25. Similarly, the Digital data converted from the APRM signals is outputted as APRM data to the process control computer 19 and the monitor signal calculating unit 25.

The process computer 19 is started up periodically or at timings according to a start-up command transmitted from an input/output unit 20. The input/output unit 20 has an input device for transmitting the start-up command and other operation commands to the process computer 19 by an operation of the input device by an operator.

The process computer 19, which has been started up, is operative to receive neutron flux data including the LPRM data and the APRM data and to receive the core state data so as to calculate a present neutron flux distribution of a fundamental mode (a basic mode) in the care 12 at the start-up timing on the basis of the neutron flux data and the core state data. The process computer 19 calculates the present neutron flux distribution of the fundamental mode in the core 12 at the present state, the above calculating operation corresponding to a monitoring operation of the state of the core 12 of the reactor 10.

The process computer 19 has a predicting operation in addition to the monitoring operation. That is, the process computer 19 calculates a state of the core 12 specified by the operator on the basis of the latest result of the monitoring operation so as to predict it, and computes a predicted neutron flux distribution of the fundamental mode in the predicted state of the core 12.

The present neutron flux distribution of the fundamental mode concerning the present state of the core 12 and the predicted neutron flux distribution of the fundamental mode concerning the predicted state thereof, each of which is computed by the process computer 19, are outputted to the input/output unit 20 as input/output means, respectively. The input/output unit 20 has an output device for outputting the present and predicted neutron flux distributions by means of the output device thereby informing the present and predicted flux distributions to the operator.

Moreover, the present and predicted flux distributions are outputted from the process computer 19 to a stability predicting unit 21. The stability predicting unit 21 transmits the present and predicted flux distributions to a display unit 22 so that the state of the core 12 related to the present and predicted flux distributions are displayed thereon, respectively.

The process computer 19 also has a higher mode computing unit 24 (hereinafter, referred to simply as computing unit), as higher mode computing means, integrated therein. Incidentally, the computing unit 24 may be located independently from the process computer 19, or an operation of the computing unit 24 may be realized by other operation of the process computer 19.

The computing unit 24 computes a higher mode of the neutron flux distribution on the basis of the neutron flux data and the core state data. The computed higher mode of the neutron flux distribution is outputted from the computing unit 24 to a monitoring signal computing unit 25. A method of computing the higher mode computing method by the computing unit 24 has been described in a document "Detailed numerical calculus operation" written by Hayato Togawa, published by Kyoritsu Publisher or other similar documents.

On the other hand, each LPRM signal sampled and digitized by the A/D converter 18 is inputted to the monitoring signal computing unit 25, and then, at least one optimal filter based on phase differences and amplitude differences between the LPRM signals is generated on the basis of the LPRM signals actually measured by the neutron flux measuring device 13.

In the monitoring signal computing device 25, at least one first filter (first weighting coefficient) corresponding to the fundamental mode of the neutron flux distribution computed by the process computer 19 and at least one second filter (second weighting coefficient) corresponding to the spatial higher mode of the neutron flux distribution computed and extracted by the higher mode computing device 24 are generated. Namely, in the monitoring signal computing unit 25, the filter, the first and second filters are gained in accordance with the core state and oscillating characteristics in the actually measured respective LPRM signals.

Further, in the monitoring signal computing unit 25, each actually measured and inputted LPRM signal is filtered (averaged) through the filter based on the phase differences and amplitude differences of the LPRM signals, the first filter gained from the fundamental mode or the neutron flux distribution and the second filter gained from the spatial higher mode of the neutron flux distribution. Each of the signals filtered through the filter, the first and second filters is inputted to a stability monitoring unit 26, as stability monitoring means, which is connected to the monitoring signal computing unit 25 in on-line and the input/output unit 20. In the input/output unit 20, each filtered LPRM signal to outputted through the output device thereof so that the information concerning each filtered LPRM signal is given to the operator.

In the monitoring system of this embodiment, in a case of computing the APRM signals on the basis of the LPRM signals from the neutron flux detectors 15, in addition to the APRM signals in which the analog LPRM signals are averaged, new power oscillation signals (referred to as RPRM signals, stability monitoring signals or reactor divisional power range detector signals) are gained with the use of the first and second filters for selectively extracting oscillation modes having spatial dependencies, and then, the stability of the core 12 is monitored on the basic of the RPRM signals so that the monitored stability of the reactor core 10 is transmitted to a display unit 22 thereby being displayed thereon.

In this case, it is possible to readily gain the first and second filters on the basis of the number of using LPRM signals, arrangement of the LPRM signals or the like, and a method for readily obtaining the first and the second filters may be included in the monitoring system as an option.

When the output signals corresponding to the RPRM signals obtained through the first and second filters are inputted to the stability monitoring unit 26. The stability monitoring unit 26 successively calculates a decay ratio (amplitude reduction ratio) representing a ratio of respective adjacent amplitudes of the RPRM signal, a resonant frequency of the RFRM signal, said decay ratio and said resonant frequency representing the state of the stability of the core 12. The stability monitoring unit 26 also, simultaneously to the decay ratio and the resonant frequency, successively calculates an amplitude of the RPRM signal representing a magnitude of oscillation of the RPRM signal.

The stability of the core 12 is evaluated by the stability monitoring unit 26 in on-line on the basis of these calculated values of the parameters. On the basis of the APRM signal, the stability monitoring unit 26 monitors a core stability relative to a mode of an oscillation varying integrally in the core 12. Simultaneously to monitoring the core stability on the APRM signals, the stability monitoring unit 26 monitors the mode of the oscillation varying integrally in the core 12 and a regional stability in the core 12 on the basis of the RPRM signals so as to always monitor a power oscillation dependent on the space in the core 12 in a real time.

Moreover, a plurality of weighting coefficients corresponding to the filters are prepared so that it is possible to estimate each central line of each oscillation from each phase diagram (Lissajous' figure) of each signal gained by using each weighting coefficient (each filter). Similarly, one kind of filter coefficient is rotated, whereby it is possible to estimate a central line of the oscillation from a response of the RPRM signal.

That is, by estimating the decay ratios and the amplitudes of the APRM signal and the RPRM signal, and the center line of the oscillation according to the plurality of RPRM signals or the RPRM signal rotating the weight coefficient, it is possible to estimate the spatial higher mode of the oscillation which is dominant in the actual core 12 and to monitor the core 12 and the range stability in the core 12 in on-line.

Further, the process computer 19 is operative to read out the core state data generated by the core state data measuring device 17 and the A/D converter 18 and the LPRM signals at periodic intervals. The process computer 19 is also operative to generate core state information data representing the state in the core 12 at the reading-out timings according to the core state data and the LPRM signals. For example, the core state information data includes a power distribution in the core 12, a quantity distribution of the flow of the coolant and other information. The process computer is furthermore operative to record the core state information data on a storage region therein in response to the reading out timings.

The stability predicting unit 21 is operative to predict a stability of an arbitrary core state according to a stability analysis model comprising a physical model on the basis of the updated core state information data recorded in the process computer 19.

Figure 4:
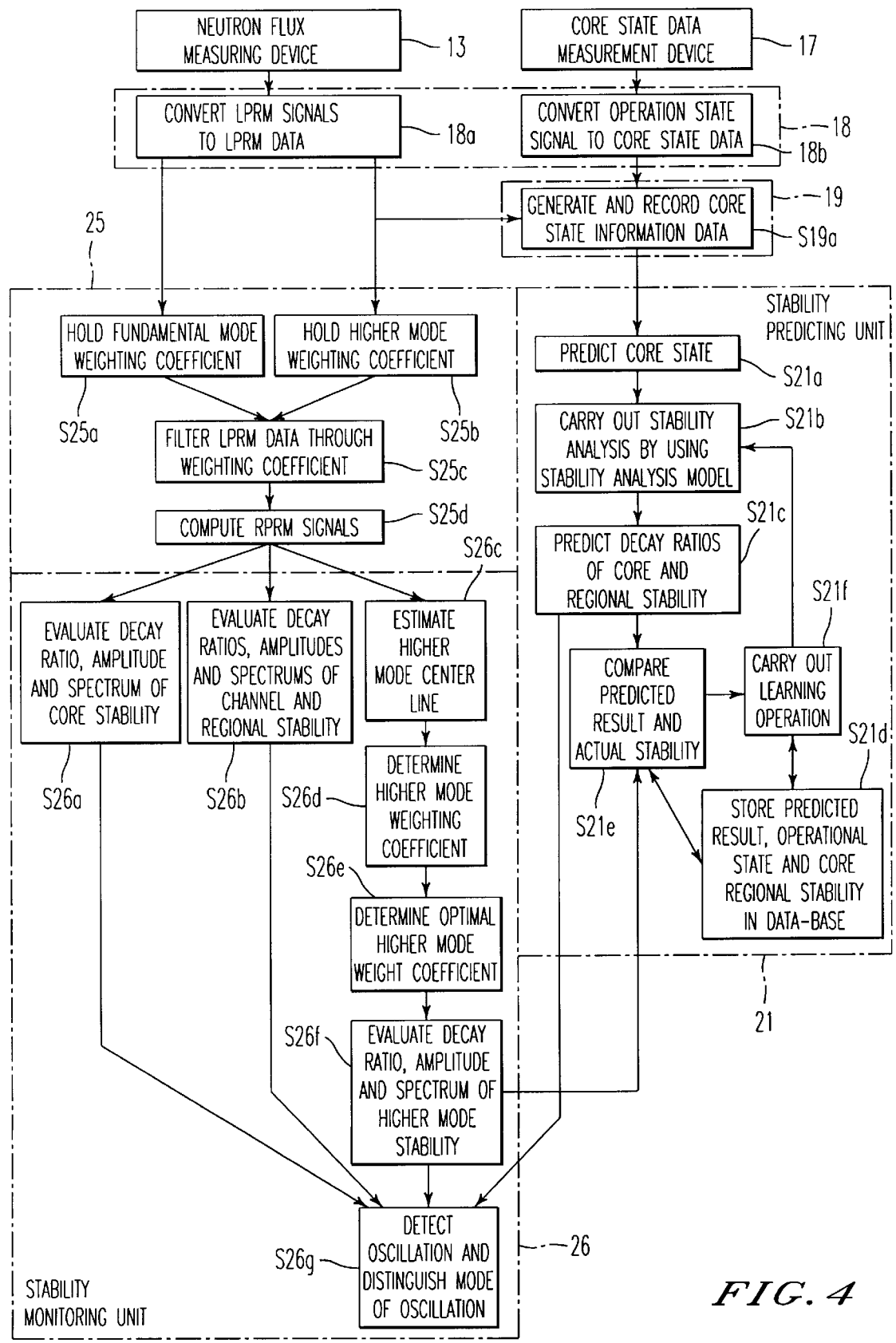
FIG. 4 is a flow chart schematically showing a procedures of monitoring power of the nuclear reactor in the system according to the embodiment of the present invention.
Figure 5:
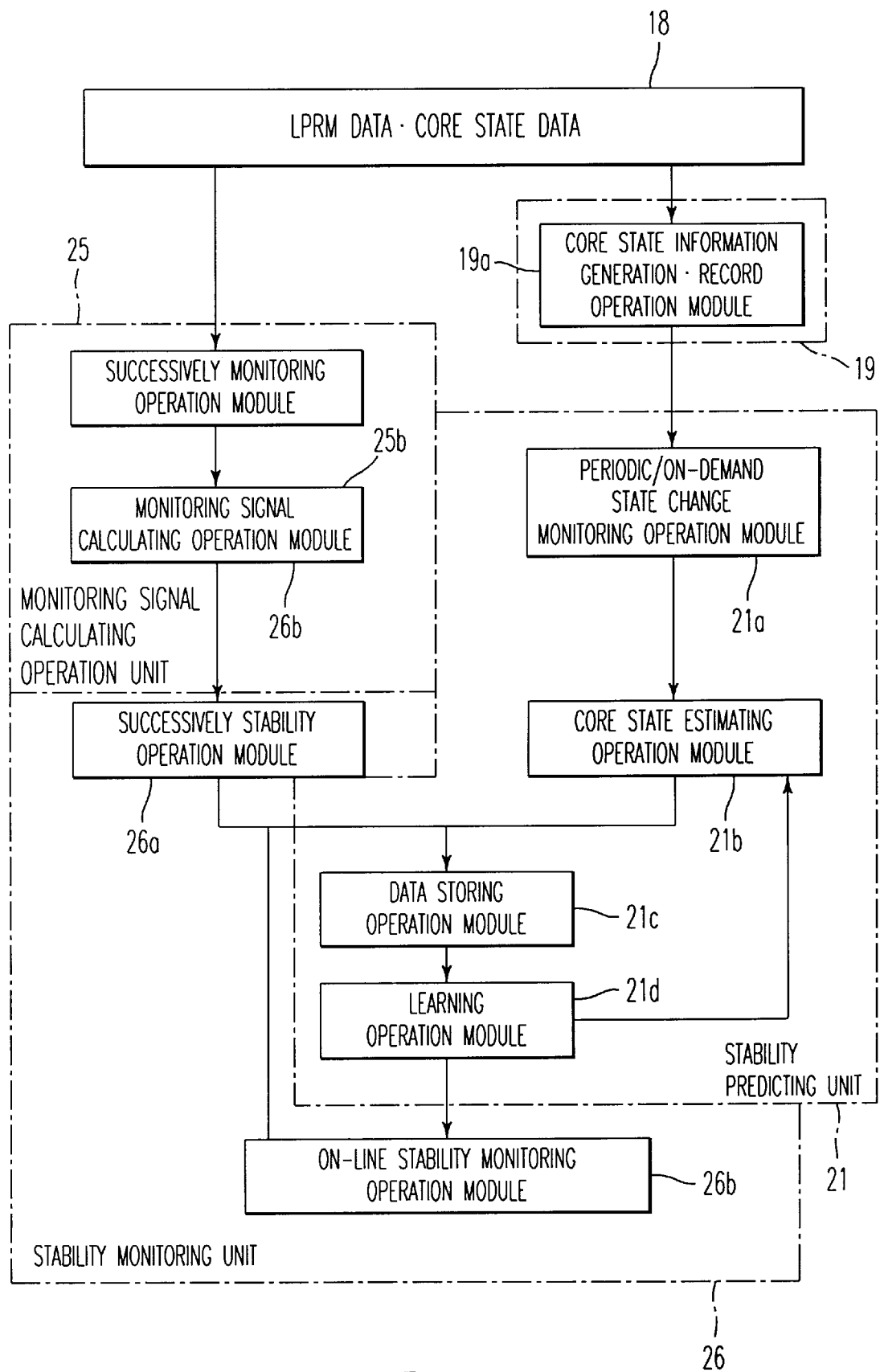
FIG. 5 is an operational block diagram showing operational modules of the system according to the embodiment of the present invention.

FIG. 4 is a flow chart schematically showing procedures of monitoring the power of the reactor 10 and predicting the arbitrary stability of the core state in the monitoring system of this embodiment, and FIG. 5 is a substantially block diagram showing operations of the monitoring system of this embodiment.

In FIGS. 4, 5, each of the LPRM signals and each of the core operation state signals are digitized to be converted to the LPRM data and the core state data by the A/D converter 18.

The digitized LPRM data and the core state data are outputted to the process computer 19 and the monitoring signal computing unit 25, referred to steps S18a and S18b shown in FIG. 4).

Similarly, the digital data converted from the APRM signals by the A/D converter 18 are outputted as APRM data to the process control computer 19 and the monitor signal calculating unit 25.

As shown in FIG. 5 the monitoring signal computing unit 25 computes the monitoring signals (RPRM signals) on the basis of the LPRM signals so as to transmit the RPRM signals to the stability monitoring unit 26. The stability monitoring unit 26 receives the transmitted RPRM signals and successively evaluates the RPRM signals so as to monitor the stability of the core 12.

Figure 19:
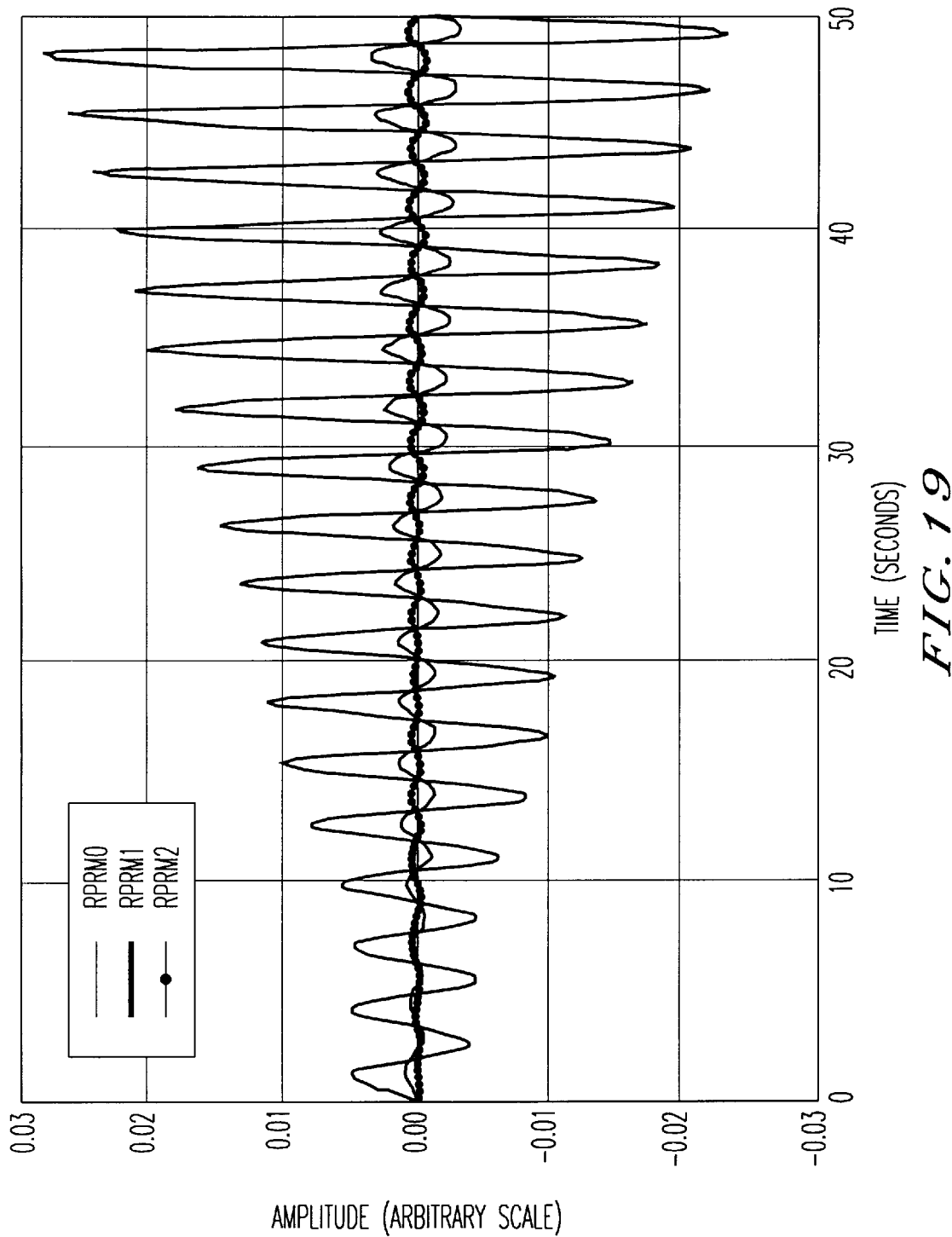
FIG. 19 is a view showing a result in a case or readily monitoring the core stability of the reactor core of the system applied to the core-wide oscillation according to the embodiment of the present invention.

The stability predicting unit 21 periodically captures the core state information data recorded on the process computer 19 and predicts, in cooperation with the process computer 19, the stability and the state of the reactor core 10 according to the operator's demand or periodically. referred to step S19a shown in FIG. 19). The above described operations of the process computer 19, the stability predicting unit 21, the monitoring signal calculating unit 25 and the stability monitoring unit 26 are schematically shown as operational modules 19a, 21a~21d, 25a~25b and 26a~26b in FIG. 5.

FIG. 4 is a schematically flow chart to explain the details of each operational module shown in FIG. 5.

More specifically, the monitoring signal calculating unit 25 subjects the successively inputted LPRM data to previously determined and held weighting coefficients (filters, or filter coefficients). That is, the monitoring signal calculating unit 25 filters the LPRM data through the weighting coefficient, such as the first weighting coefficient (first filter) corresponding to the fundamental mode of the neutron flux distribution and the second weighting coefficient (second filter) corresponding to the higher mode of the neutron flux distribution so as to generate (compute) the stability monitoring signals (RPRM signals, RPRM data), referred to steps S25a~S25d in FIG. 4. Next, the stability monitoring unit 26 successively estimates and evaluates parameters including the decay ratio, the resonant frequency, the amplitude, the spectrum and the like so on, which are related to a core stability, a channel stability and a regional (higher mode) stability according to the RPRM signals, referred to steps S26a and S26b shown in FIG. 4. As to the higher mode stability, a higher mode center line where the sensitivity of the RPRM signals become the maximum, is estimated so that the optimal higher mode weighting coefficient is determined (referred to steps S26c and s26d), and the RPRM signals are again computed (referred to step S26e), and thus, the parameters including the decay ratio, the resonant frequency, the resonant frequency, the amplitude and the spectrum, which are relative to the higher mode stability is obtained, referred to step S26f).

The stability monitoring unit 26 detects the oscillation in the core 12 on the basis of the parameters so as to distinguish the mode of the oscillation in the core 12, referred to step S26g).

The stability predicting unit 21 includes the stability analysis model comprising the physical model, and captures the updated core state information data recorded in the process computer 19 according to the operator's demand (referred to step S19a) so as to predict the core state, such as thermal-hydraulic condition, in the core 12 at the operator's demand (operator's operating point), referred to Step S21a shown in FIG. 4).

The stability predicting unit 21 carries out a stability analysis by using the thermal-hydraulic condition and the stability analysis model at the operator's demand(referred to Step S21b) so as to predict the decay ratios of the core and regional stability in the core 12 at the operator's demand, referred to Step S21c).

Further, the stability predicting unit 21 stores the predicted results including the predicted core and regional stability, the operational state including the thermal-hydraulic condition at the predicting time and the monitored core and regional stability of the actual core 12 obtained by the stability monitoring unit 26 in a data-base provided for the stability predicting unit 21, referred to Step S21d.

The stability predicting unit 21 compares the predicted result and the actual stability stored in the data-bass (referred to Step S21e) and carries out a learning operation such that the stability predicting unit 21 obtain a bias between the predicted result (predicted core and regional stability) and the monitored core and regional stability so as to correct input parameters of the stability analysis model, thereby getting rid of the bias, referred to Step S21f.

Therefore, the monitoring system makes it possible to detect a power oscillation which is hard to be detected by the APRM signal.

Next, the following is an explanation of a filter calculation operation of the monitoring signal computing unit 25.

The desired filter has two kinds, and one of them is a filter which is obtained by computing actually measured each LPRM signal always inputted from the A/D converter 18; the other is a filter which is obtained by extracting a space higher mode distribution computed by the higher mode computing device 24.

The former is a filter which is computed on the basis of an actually each measured LPRM signal successively or continuously detected. On the other hand, the latter is a filter which is computed on the basis of information from the process computer 19, and reflects a power distribution in the core 12 in accordance with a change of operating state, for example, a change in an operating point by the control rod 16 operation or a recirculation flow operation. The latter filter is-obtained via the process computer 19 when the reactor core state is intentionally changed.

The former filter obtained by the monitoring signal computing unit 25 is obtained in a manner of determining a statistic of each actually measured LPRM, that is, a correlation function and a variance value of each LPRM signal successively or every short interval (several tens of seconds). Incidentally, the correlation function and a variance value of each LPRM signal may be determined continuously.

In the higher mode computing device 24 of the process computer 19, a space higher mode of the neutron flux distribution is computed. Assuming that a space dependent time oscillating neutron flux $\phi$ (r, t) in the core 12 of the reactor 10 is constructed by overlap of the space higher mode neutron flux distributions, the following equation (1) is established.

$$\Phi(r, t) = \sum_{m=0}^{\infty} n_m(t)\phi_m(r) \quad (1)$$

where, $\phi_m(r)$ represents the space higher mode of the neutron flux distribution in a normal operation, and $n_m(t)$ represents an amplitude function where m mode of the neutron flux timely varies. The above equation (1) satisfies the following characteristic equation (2).

$$L(r)\phi_m(r) = \frac{1}{\lambda_m} M(r)\phi_m(r) \quad (2)$$

where, L(r) and M(r) are respectively a destruction (diffusion, absorption, etc.) operator and a production (nuclear fission) operator, which do not depend upon time, and $\lambda_m$ is an eigen value.

A relationship as expressed by the following equation (3) is established between eigen values $\lambda_m$ shown in the characteristic equation (2).

$$\lambda_0 > \lambda_1 > \lambda_2 > \ldots \quad (3)$$

Namely, as seen from the above equation (3), the eigen value $\lambda_0$ of a lowest mode is the largest, and in the normal operation, only eigen value $\lambda_0$ of the lowest mode finally remains, for this reason, the lowest mode is called as the fundamental mode.

A time transition in the fundamental mode is expressed by a well-known dynamic characteristic equation. Thus, the time transition in the m mode neutron flux (hereinafter, the mode of m >0 is referred as higher mode) is expressed by the following dynamic characteristic equations (4) and (5).

$$\frac{dn_m(t)}{dt} = -\frac{\Delta\rho_m + \beta}{\Lambda_m} n_m(t) + \sum_{i=1}^{N} \lambda_i c_{i,m}(t) + \frac{\rho_{m0}(t)}{\Lambda_m} n_0 + \sum_{n=0}^{\infty} \frac{\rho_{mn}(t)}{\Lambda_m} n_n(t) \quad (4)$$

$$\frac{dc_{i,m}(t)}{dt} = \frac{\beta_i}{\Lambda_m} n_m(t) - \lambda_i c_{i,m}(t) \quad (5)$$

where,
$\Lambda m$: neutron lifetime (s)
$\Delta\rho_m$: sub-criticality of m mode to fundamental mode
$\beta$: total delayed neutron generating ratio
$\lambda_i$: i-th delayed neutron precursor decay constant (s$^{-1}$)
$c_{i,m}(t)$: i-th delayed neutron precursor density
$\rho_{m0}(t)$: reactivity of m mode
$n_0$: steady component of neutron flux
$\rho_{mn}(t)$: n-tzi reactivity
$n_n(t)$: time transition of neutron flux
$\beta_i$: i-th delayed neutron generating ratio The $\Delta\rho_m$ shown in the above equation (4) is a sub-criticality of the m mode to the fundamental mode, and the sub-criticality is defined by the following equation (6).

$$\Delta \rho_m = \frac{1}{\lambda_m} - \frac{1}{\lambda_0} \qquad (6)$$

On the other hand, an orthogonal relationship as shown in the following equation (7) is established between the respective higher modes.

$$\int_{core} \phi_m^+(r) M(r) \phi_n(r) dr = \delta_{mn} \qquad (7)$$

In a large-size core such as the reactor, a skew may be disregarded in the dynamic higher mode distribution. In general, a control of the reactor core is carried out for each ¼ core; therefore, the orthogonal relationship as shown in the following equation (8) is substantially directly satisfied between the higher modes.

$$\int_{core} \phi_m^+(r) \phi_n(r) dr = \delta_{mn} \qquad (8)$$

In the above equations (7) and (8), $\phi_m^+(r)$ means an adjoint neutron flux. In the following description, a group of neutron fluxes is considered. Therefore, $\phi_m^+(r)$ coincides with the neutron flux distribution $\phi_m(r)$. Namely, the above equation (8) is expressed by the following equation (9).

$$\int_{core} \phi_m(r)\,_n(r) dr = \delta_{mn} \qquad (9)$$

In order to extract a specific mode component, for example, only time transition of the n mode from the above equations (1) and (9), the total neutron flux is multiplied by the n mode of the neutron flux distribution over the whole of reactor core. Namely, the following equation (10) is established.

$$\int \phi_n(r) \Phi(r,t) dr = \int \phi_n(r) \sum_{m=0}^{\infty} n_m(t) \phi_m(r) dr = n_n(t) \qquad (10)$$

Therefore, neutron flux mode distributions which are watched as the filters (the weighting coefficients) may be suitable. However, the neutron flux distribution $\phi(r, t)$ is not measured, but many LPRM signals (for example, 172 channels in a typical BWR of the 110 ten-thousand KWe) existing in the core 12 are used. That is, the LPRM signal arranged on a certain place (r) in the core 12 is set as the LPRM (r, t), and then, the higher mode distribution around the LPRM (r, t) is used, and thereby, the following equation (11) is established.

$$n_n(t) \approx \int \bar{\phi}_n(r) LPRM(r,t) dr \approx \Sigma \bar{\phi}_n(r) LPRM(r,t) \qquad (11)$$

Thus, by multiplying the LPRM (r, t) at the (r) in the core 12 by the $\bar{\phi}_n(r)$ as the weighting coefficient around the LPRM (r, t), it is possible to approximately extract a time transition (oscillation of the neutron flux) $n_n$ (t), of the n mode of the neutron flux. In the above equation (11), $\bar{\phi}_n(r)$ is indicative of an average higher mode distribution around the neutron flux detector 15 disposed at (r) in the core 12.

In the above equation (11), in the APRM signal, a fixed value is used as the weight regardless of the higher mode of the neutron flux. The APRM signal contains the time transition of the total neutron flux modes. As seen from the above description, it is considered that many higher modes are generally contained in the transitional neutron flux oscillation in the experimental reactor core 12. However, the following matters have been confirmed from both analysis and evaluation results of actual machine data. That is, an oscillation component of the fundamental mode is dominant in the core-wide oscillation; on the other hand, an oscillation component of a direction angle primary mode is dominant in the regional oscillation.

Conventionally, the core stability has been evaluated according to the APRM signal; however, there is a need of using the signal weighted in the fundamental mode in order to further accurately evaluate the core stability.

According to the aforesaid principle, it is the best to use the higher mode distribution including the fundamental mode distribution as the filter coefficients (see the specification of U.S. Pat. No. 5,406,598).

However, at the current stage, it is difficult to determine the higher mode distribution one by one, and to use the distribution-as the filters.

For this reason, this embodiment of the present invention proposes the monitoring system which can obtain an effect more than a method using the higher mode distribution including the fundamental mode distribution by using a devised simple method, and further, can be readily mounted.

In a case where the higher mode distribution in an actual state of the core 12 is not determined, first, assuming that a neutron flux distribution $\phi_{lmn}$ (r, θ, z) of a bare cylindrical homogeneous reactor core is used, and three direction index is set as (l, m, n), the following equation (12) is obtained.

$$\phi_{lmn}(r,\theta,z) = (A\cos(m\theta) + \beta\sin(m\theta)) J_m(X_{m,n} r/R) \sin(l \pi z/H) \qquad (12)$$

where, $J_m(x)$: m-order Bessel function $X_{m,n}$: n-th zero point of m-order Bessel function R: core radius H: core height In the fundamental mode which is a mode relative to the core-wide oscillation, the corresponding index is m=0 and l=n=1. Further, in a circumferential primary mode which is a mode relative to a regional oscillation, the corresponding index is l=m=n=1.

Therefore, in a z-axis direction mode, the fundamental mode and the circumferential primary mode coincides with each other. In the higher mode m≧1, the distribution becomes periodic with respect to the direction angle θ; for this reason, m-linear zero points are added. Thus, in the circumferential primary mode (m=1), two different distributions orthogonal to each other exist with respect to the same eigen values (i.e., the eigen value is double degenerative).

Since notice is taken with respect to the stability of the neutron flux distribution in a lateral sectional direction of the core 12, which is orthogonal to the axial direction of the core 12, m-order Bessel function $J_m(X)$ is use as the filter coefficient.

In the fundamental mode, since the corresponding index is m=1, n=1; therefore, if $J_0(X_{0,1} r/R)$ is used as the first filter coefficient (first weighting coefficient), it is possible to selectively extract the mode corresponding to the core stability. In the circumferential primary mode, since the index is m=n=1, if $J_1(X_{1,1} r/R) \cos \theta$ is used as the second filter coefficient (second weighting coefficient), it is possible to selectively extract the mode relative to the regional stability.

Since the aforesaid m-order Bessel function is a mode distribution in a bare homogeneous core, the mode distribution does not coincide with a mode distribution of the actual core 12. However, the core control is carried out for each ¼ core. Thus, the neutron flux distribution with respect to the lateral cross section in the core 12 is indicative of a distribution relatively closing to the m-order Bessel function (see FIG. 6). Therefore, it is considered that it is possible to obtain an accuracy sufficient in a purpose for stability monitoring.

Figure 6B:
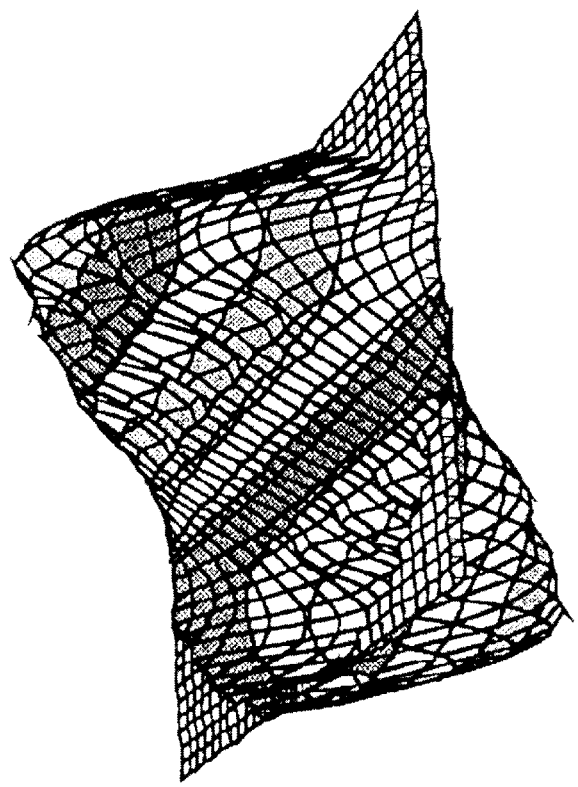
FIG. 6 is a view showing an actual circumferential primary mode distribution and a primary Bessel function distribution as compared with the actual circumferential primary mode distribution according to the embodiment of the present invention.
Figure 6A:
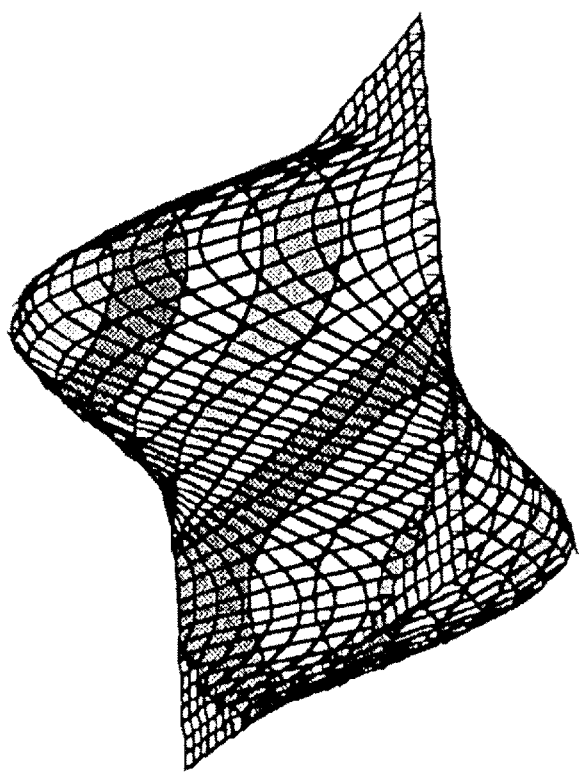

In FIG. 6. the drawing on the right-hand side shows the actual circumferential primary mods distribution in the core 12 of the typical BWR; on the other hand, the drawing on the left-hand side shows the primary Bessel function distribution equivalent to the circumferential primary mode distribution in the homogeneous core 12. As seen from FIG. 6, It is found that the latter (primary Bessel function distribution) approximates to the former (actual circumferential primary mode distribution).

In this case, however, the circumferential primary mode is a multiple root; for this reason, there exist two kinds, that is, $J_1(X_{1,1}r/R)\cos\theta$ and $J_1(X_{1,1}r/R)\sin\theta$ orthogonal thereto. Thus, if an actual oscillation mode is a distribution orthogonal to a prepared filter distribution, it is impossible to extract the oscillation mode by the filter. It is difficult to accurately predict an actually generated regional oscillation; therefore, two kinds of filters orthogonal to each other, that is, as the second filter corresponding to the circumferential primary mode, two kinds of filters $J_1(X_{1,1}r/R)\cos\theta$ and $J_1(X_{1,1}r/R)\sin\theta$ are previously prepared.

Figure 7:
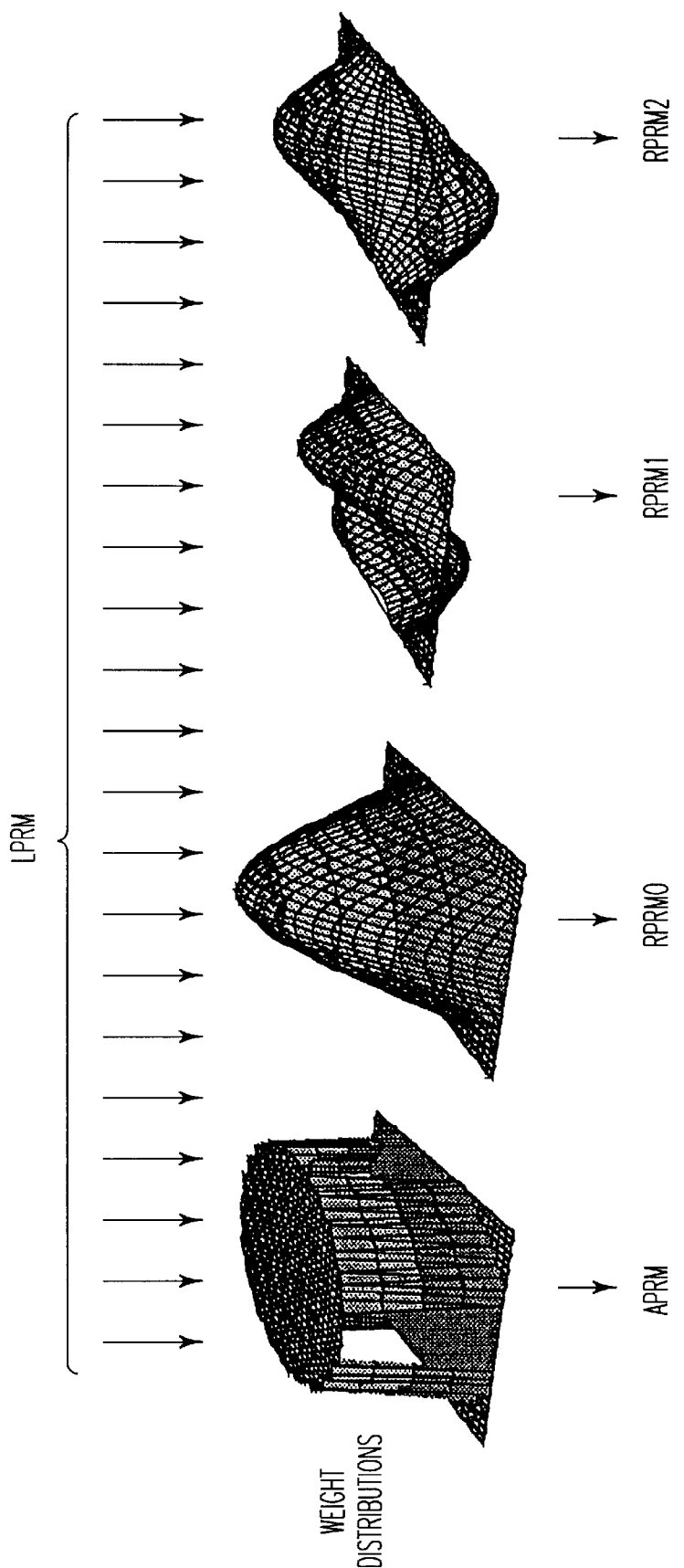
FIG. 7 is a conceptual view showing a method of generating new RPRM signals by using different weight distributions, which is introduced in the system according to the embodiment of the present invention.

In this case, the monitoring signal obtained by using the fundamental mode distribution as the first weighting coefficient is referred to as RPRM0, and the monitoring signal obtained by using the circumferential primary mode distributions orthogonal to each other as the second weighting coefficient is referred to as RPRM1/RPRM2. FIG. 7 shows various procedures of generating the RPRM signals by the aforesaid filters.

FIG. 7 is a conceptual view showing weight distributions in the case of using the APRM signal and the RPRM signals. More specifically, the conventionally used APRM it obtained by using the same weighting coefficient. However, the RPRM signals introduced in the present invention are obtained by using the different weighting distributions corresponding to the higher modes of the monitoring target, respectively.

That is, in the RPRM0 signal corresponding to the fundamental mods, the fundamental mode distribution is used as the weighting coefficient, and in the RPRM1/2 signals corresponding to the circumferential primary mode, the circumferential primary mode distributions orthogonal to each other are used as the weighting coefficients of the RPRM1/2 signals, respectively.

In particular, in the regional oscillation where a spatially phase difference is generated, since there is a phase difference between LPRM signals, a cancellation is mutually made between the conventional LPRM signals when the APRM signal is obtained. As a result, a signal sensitivity lowers. On the contrary, in the each of the RPRM1/2 signals, the phase difference is corrected by the weighting coefficient used as the filter, so that no canceling is generated. Therefore, a high sensitivity signal can be obtained. The above-mentioned circumstances is shown in FIG. 8.

Figure 8:
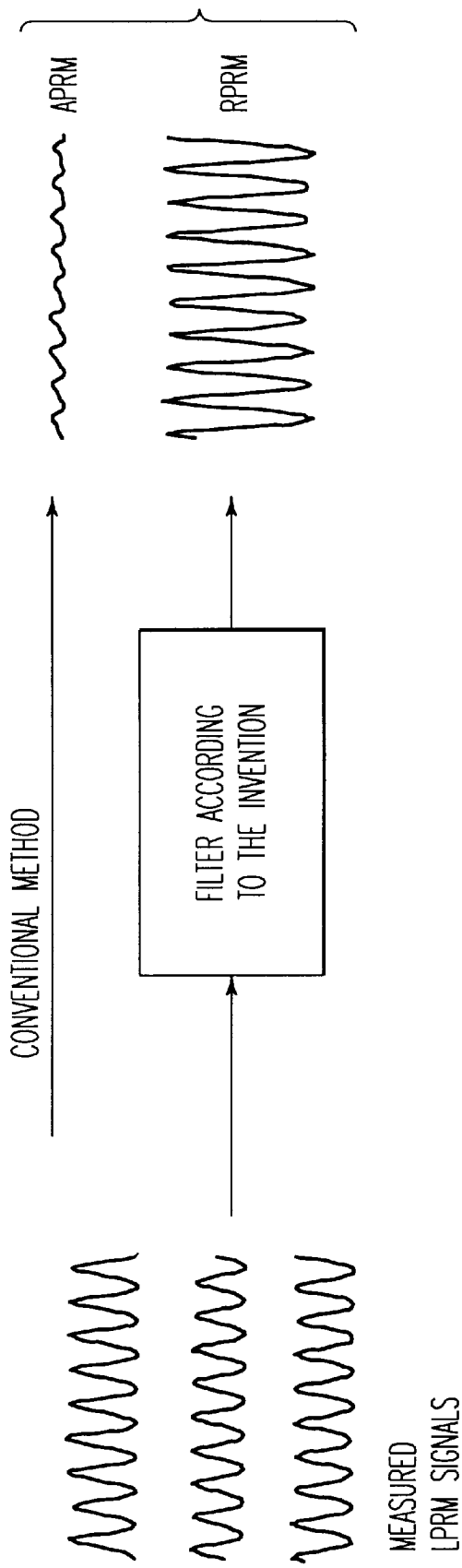
FIG. 8 is a view showing an effect obtained by using the filter according to the present invention of the system in accordance with the present invention, as compared with a conventional method of generating an APRM signal with no use filters.

As seen from FIG. 8, in the APRM signal obtained by using the came weight coefficient according to the conventional method, individual LPRM signals mutually make canceling; as a result, the signal itself is damped. On the contrary, in the RPRM signal introduced in the present invention, no canceling is generated, and it is possible to extract a response of the target higher mode.

Next, the following is a description in which an example of monitoring oscillation using the filters is applied to a simulating oscillation data using a three-dimensional dynamic characteristic analysis code.

Figure 9:
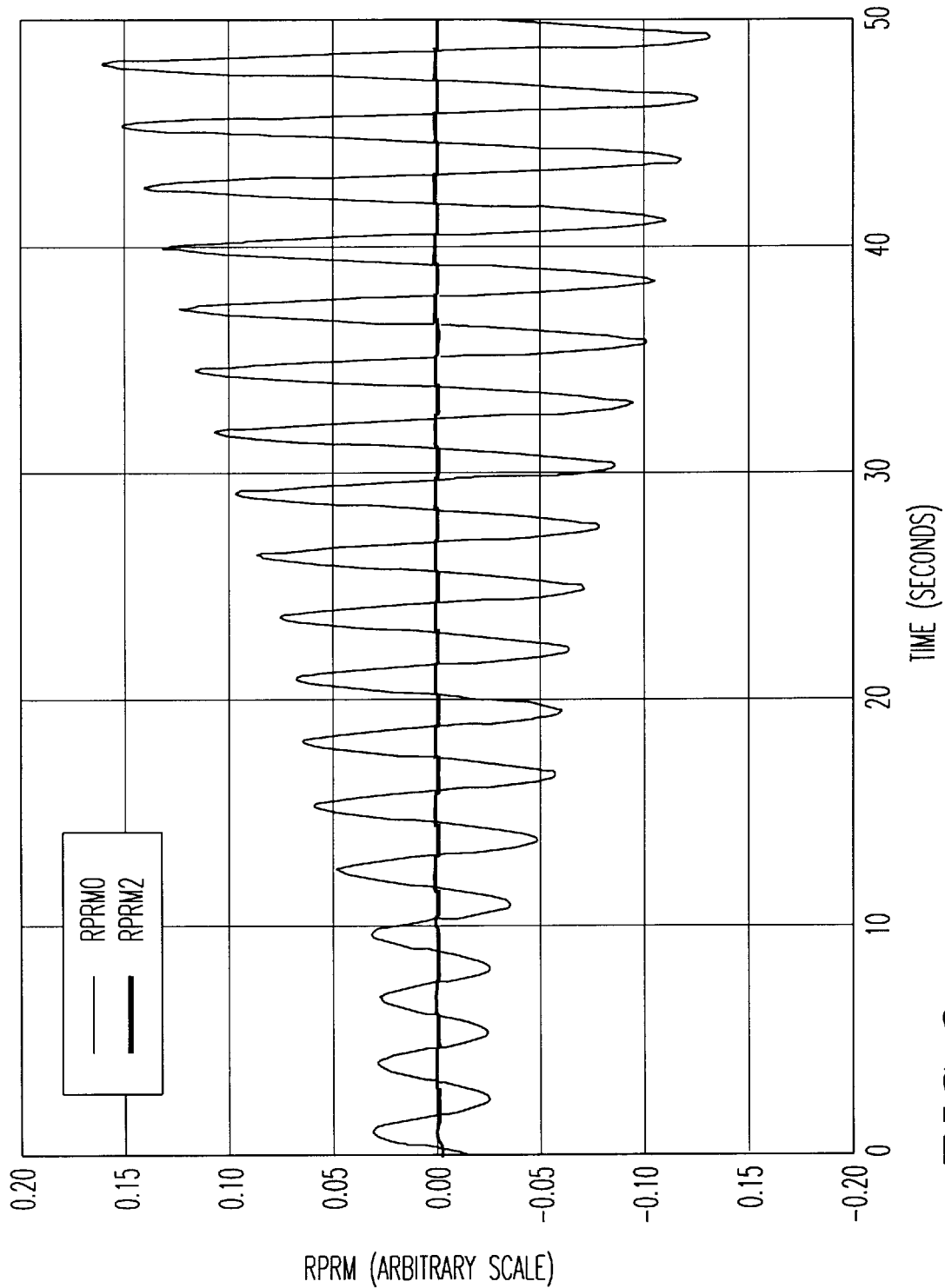
FIG. 9 is a view showing responses of the RPRM signals in a core-wide oscillation, respectively, as an example of monitoring a power stability of the system according to the present invention.

First, FIG. 9 shows an example in which the oscillation monitoring is applied to the core-wide oscillation. An oscillation phenomenon is accurately captured by the RPRM0 signal corresponding to the fundamental mode; however, an oscillation component is not contained in the RPRM2 (RPRM1) signal. More specifically, it can be found from a difference between the RPRM0 signal and the RPRM1/RPRM2 signal that this oscillation phenomenon is the core-wide oscillation.

Figure 10:
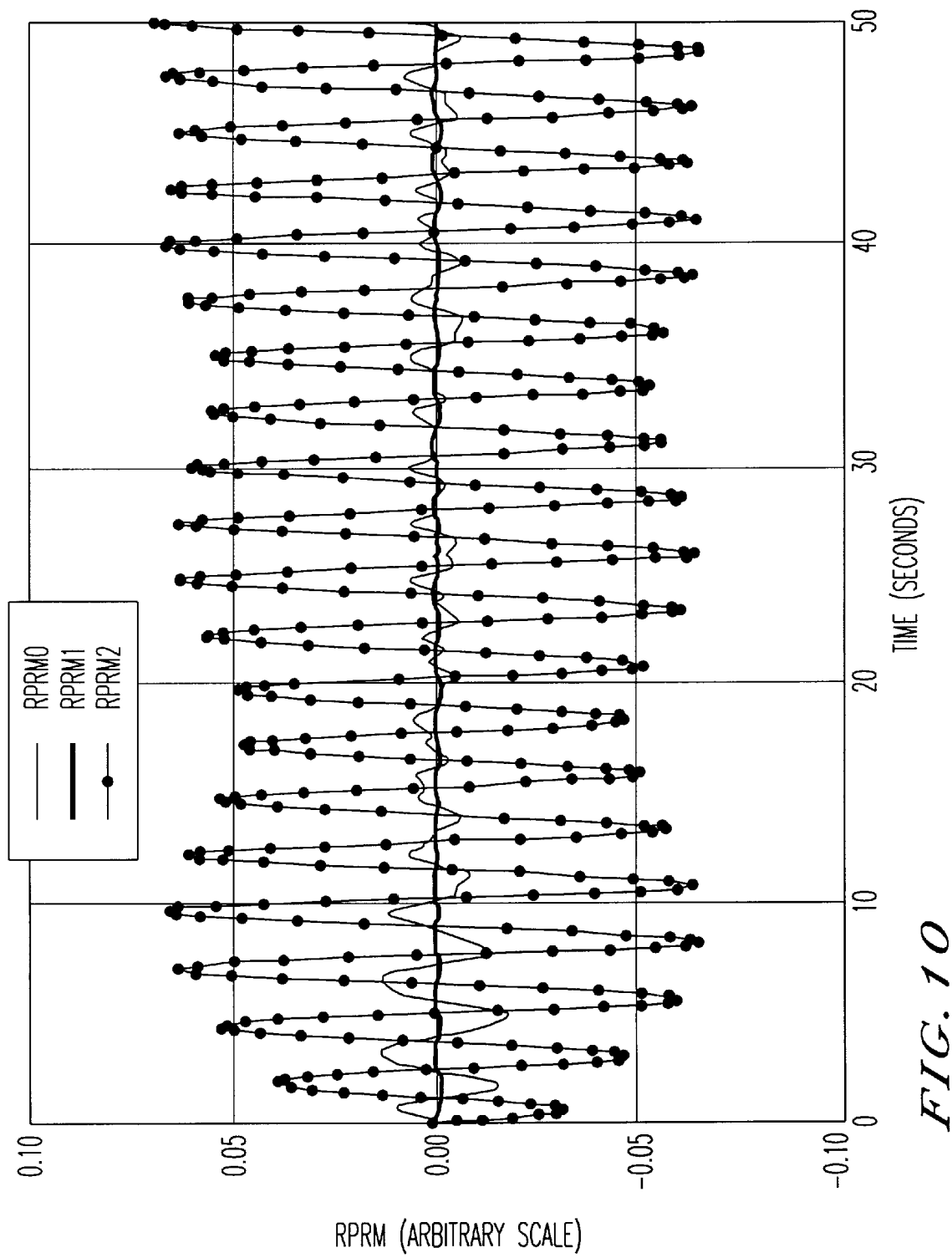
FIG. 10, as an example of monitoring a power stability of the system according to the present invention, is a view showing responses of the RPRM signals in a regional oscillation, respectively.
Figure 11:
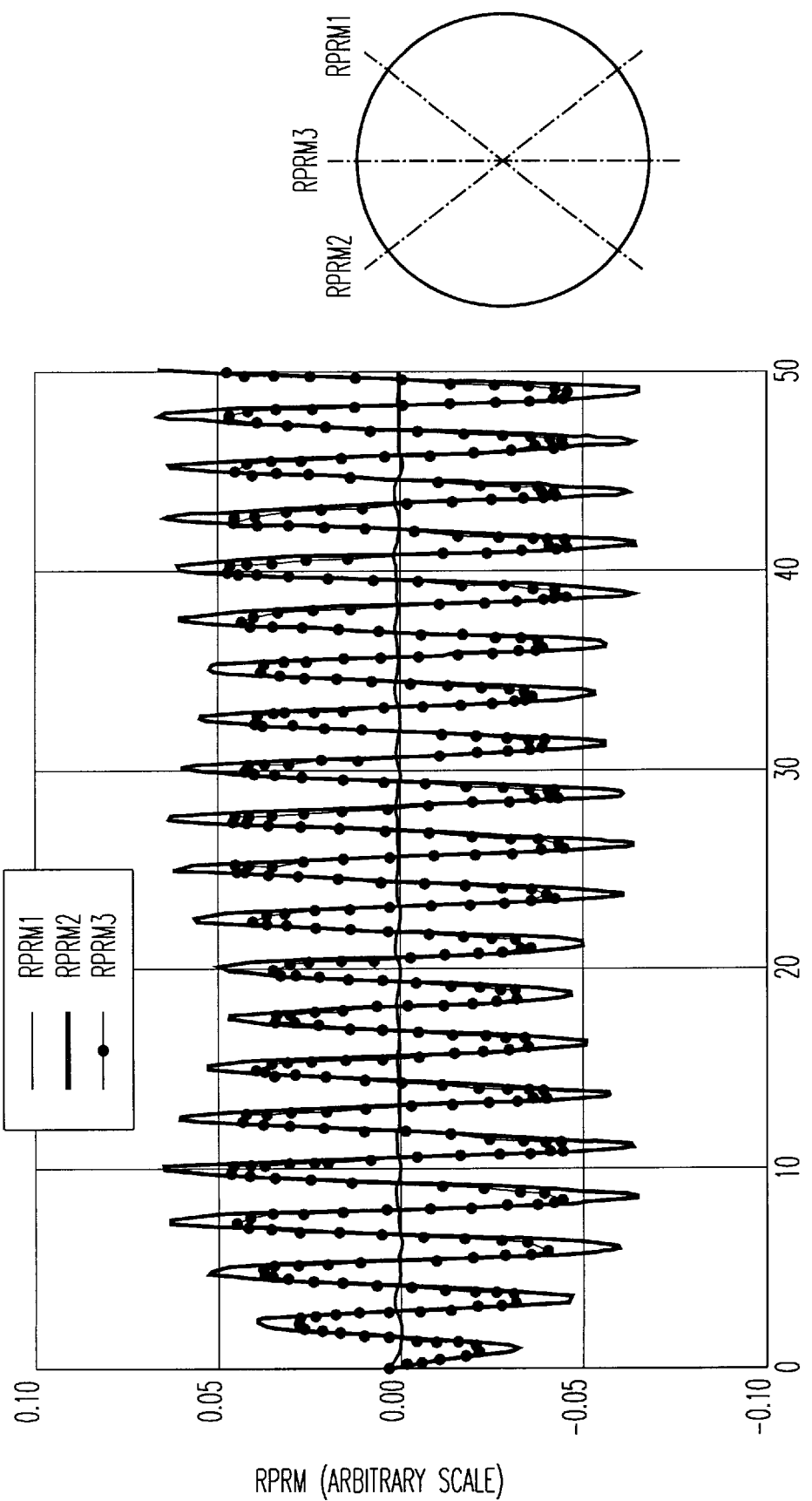
FIG. 11, as an example of showing a relationship between a weight coefficient distribution for monitoring a power stability and responses of the RPRM signals in the system according to the embodiment of the present invention, is a view showing a difference between monitoring signal responses when the higher mode of weighting coefficient is rotated along an angle θ of a border line (a center line) changing a positive and negative sign of the higher mode of the weighting coefficient.

Likewise, FIG. 10 shows an example in which the oscillation monitoring is applied to the regional oscillation. As seen from FIG. 10, the oscillation of RPRM2 signal is larger as compared with the RPRM0 and RPRM1 signals, and has a clear period (cycle). Thus, it can be found that this oscillation is the regional oscillation in a direction equivalent to a distribution of the weight coefficient of RPRM2 signal (in this case, angle of the center line of the oscillation is an angle of 135°). FIG. 11 shows a relationship between the weighting coefficient distributions of RPRM signals and RPRM signal responses.

In FIG. 11, since the analysis result used in FIG. 10 is used, the RPRM2 signal uses the weighting coefficient corresponding to the oscillation direction of the regional oscillation; on the other hand, the RPRM1 signal uses the weighting coefficient orthogonal to the oscillation direction of the regional oscillation. By using an intermediate weighting coefficient between the RPRM1 and RPRM2 signals, that is, a weighting distribution shifted by 45° from both RPRM1 and RPRM2 signals, an RPRM signal is obtained, and assuming that the RPRM signal is temporarily set as an RPRM3 signal. It can be seen that an amplitude of the RPRM3 has an intermediate value between the RPRM1 and RPRM2 signals.

Figure 12:
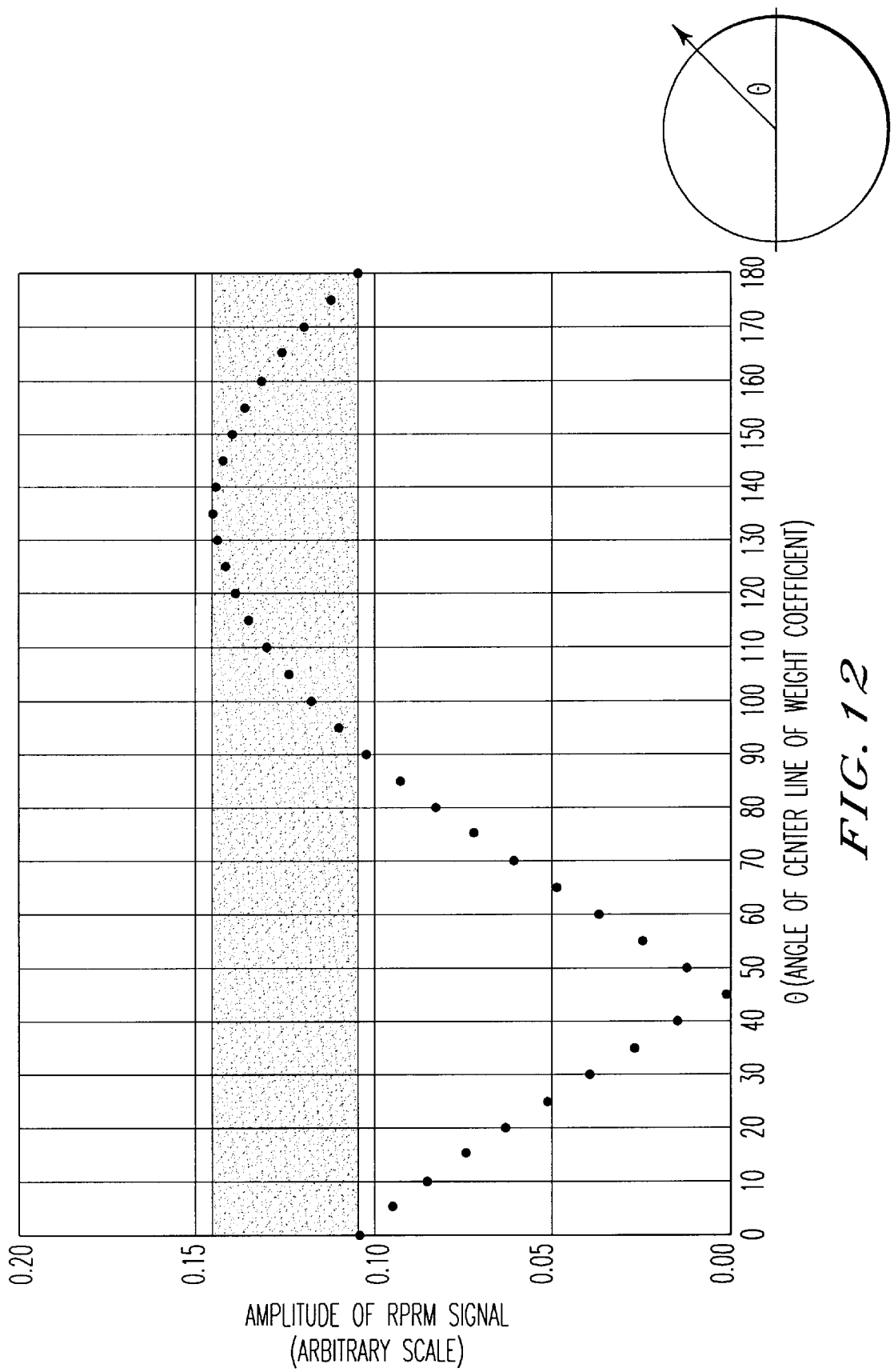
FIG. 12, as an example of showing a relationship between the angle θ of the center line of the weight coefficient and an amplitude of the RPRM signal in the system according to the embodiment of the present invention, is a view showing a correspondence of a response on a phase diagram in the RPRM signal obtained by weight coefficients orthogonal to each other and a direction of the center line in the regional oscillation.

More specifically, the regional oscillation direction (the center line of oscillation, that is, a direction in a zero point of the spatial higher mode appearing as the regional oscillation) has a close relation with the amplitude (sensitivity) of the RPRM signal via the weighting coefficient distribution. FIG. 12 shows a change in an average amplitude of the RPRM signal in the case where using $J_1(X_{1,1}r/R)\sin\theta$ is used as the weighting coefficient, and an angle of the center line where a positive and negative sign of the weighting coefficient varies, that is, the direction angle θ, is varied at 5° interval within a range from 0 to 180°.

The amplitude of the RPRM signal becomes maximum when the center line having an angle of 135° and the direction angle θ coincides with each other, that is, the sensitivity thereof becomes maximum. Conversely, when the direction angle θ is an angle (45°) orthogonal to the center line, the sensitivity of the RPRM signal becomes minimum. Therefore, by previously preparing two kinds weighting coefficients $J_1(X_{1,1}r/R)\cos\theta$ and $J_1(X_{1,1}r/R)\sin\theta$ orthogonal to each other, at least, an amplitude of one RAPRM signal axsats in an area where a half-tone dot mesh portion is shown in FIG. 12. Therefore, in order to monitor the regional oscillation, it is a necessary and sufficient condition to previously prepare the two-kind weighting coefficients similar to circumferential primary mode distributions orthogonal to each other.

Further, as seen from FIG. 12, a distribution angle of the weighting coefficient is varied (or, as shown in this figure, a plurality of weighting coefficients where each distribution angle is varied bit by bit are prepared so that the RPRM signal of each weighting coefficient is obtained), and then, it is possible to discriminate a direction Of the regional oscillation from an angle when the amplitude of RPRM signal becomes maximum. Further, it is possible to predict the direction of the regional oscillation from a behavior in a phase diagram showing the RPRM1 and RPRM2 signals using two-kinds weighting coefficients orthogonal to each other. The circumstance is shown in FIG. 13.

Figure 13:
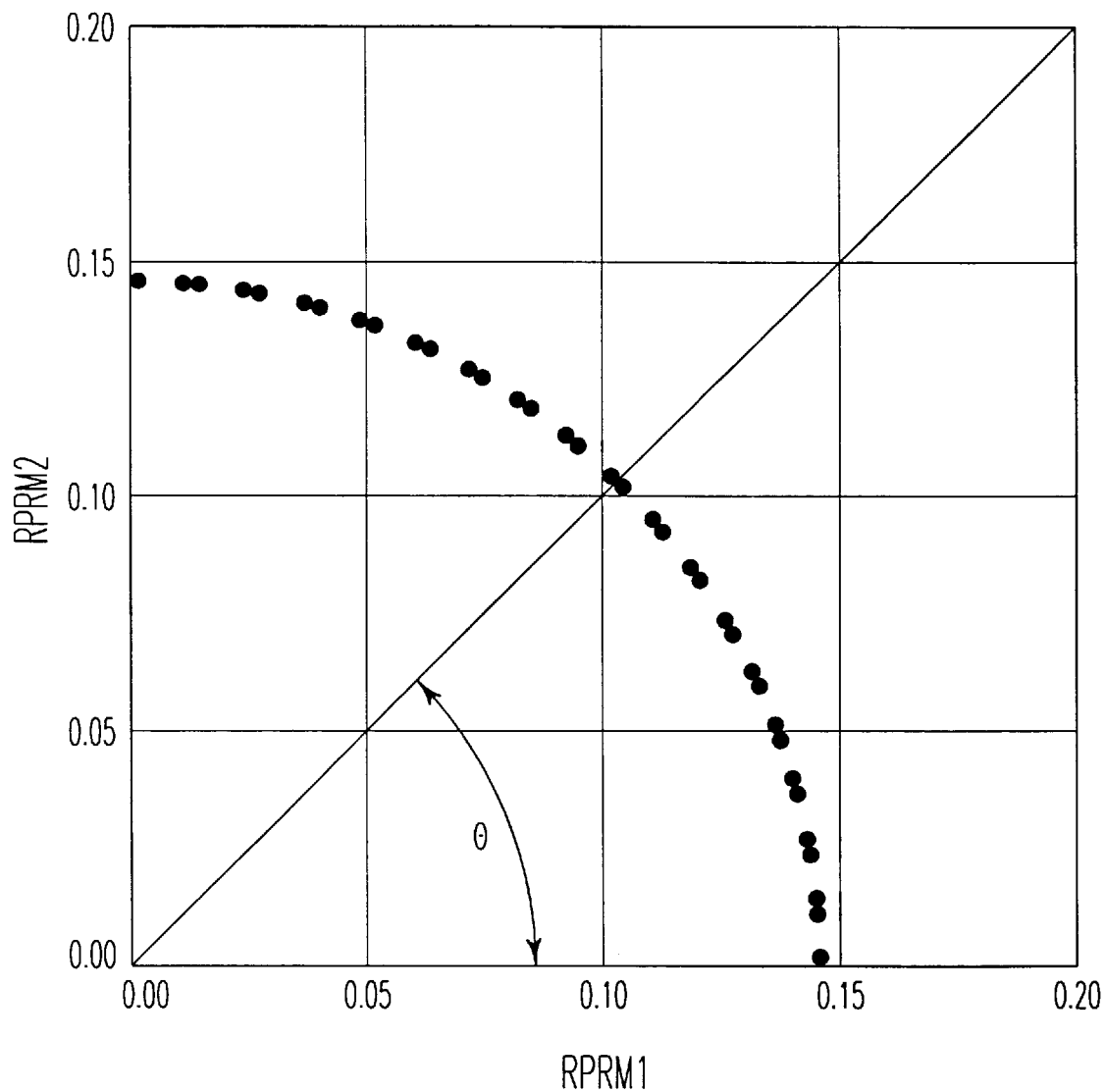
FIG. 13, as an example of monitoring the power stability in the system according to the embodiment of the present invention; is a phase diagram showing RPRM1/RPRM2 signals and a direction of the regional oscillation.

In FIG. 13, there is shown the phase diagram of two kinds of RPRM signals, that is, the change in the response of the RPRM and RPRM 2 signals using two-kinds weight coefficients orthogonal to each other with respect to the center line direction of the weighting coefficients. Then, the center line direction of the oscillation is round out from the direction angle θ when the response becomes maximum in this diagram. More specifically, in the case where the RPRM1 signal is sufficiently larger than the RPRM2 signal (in the lower right side of the diagram), an unstability of the higher mode corresponding to the RPRM1 signal is dominant; therefore, the direction of the oscillation coincides with the higher mode distribution. Conversely, in the case where the RPRM1 signal is sufficiently smaller than the RPRM2 signal (in the upper left side of the diagram). the direction of the oscillation is a direction orthogonal to the higher mode distribution. In the case of an intermediate direction (in the vicinity of diagonal), the direction of the oscillation exists in an intermediate of the center line of both distributions.

If an amplitude of any of the RPRM1 and RPRM2 signals is voluntarily biased, the direction of the regional oscillation is a direction closer to the center line of the weighting coefficient distribution of the RPRM signal having a larger amplitude. If the amplitudes of the RPRM1 and RPRM2 signals are the same, it is possible to predict that the direction of the regional oscillation is an intermediate direction between both of the RPRM1 and the RPRM2 signals. Therefore, it is means effective for the regional stability to always monitor the phase diagram showing the RPRM1 signal and the RPRM2 signal and display the phase diagram by the display unit 22.

In the case where the amplitudes of both RPRM1/2 signals are the same, the amplitudes may be compared with the amplitude of the RPRM0 signal as shown in FIG. 9 in order to make a decision whether an oscillation phenomenon is the regional oscillation or the core-wide oscillation. More specifically, the following determination is made. If the amplitude of the RPRM0 signal is voluntarily larger than each amplitude of the RPRM1 and RPRM2 signals, the oscillation is the core-wide oscillation; conversely, if the amplitude of the RPRM0 signal is voluntarily smaller than each amplitude of the RPRM1 and RPRM2 signals, the oscillation is the regional oscillation.

Therefore, in addition to the decay ratio which is an index indicative of the stability obtained from each RPRM signal, the amplitude of each RPRM signal, the period thereof and a mutual relation thereof on the phase diagram (topological space) are required in order to monitor the power oscillation phenomenon. Thus, the present invention relates to means for providing a method of determining various oscillation phenomena on the basis of synthetic analysts (see FIG. 4 and FIG. 5).

Further, the aforesaid method is applicable to monitor the stability of the reactor power including the higher mode. More specifically, the following equation (13) is used as the weighting coefficient.

$$J_m(X_{m,n}\ r/R)\sin(m\theta) \quad (13)$$

where, symbols used in the above value are the same as that used the above equation (12).

The weighting coefficient expanded to an arbitrary higher mode is used, and a direction angle θ in rotated very certain time so as to set a direction angle where a power amplitude becomes maximum. The direction angle is different depending upon a using higher mode, that is, every value of (m, n) in the above equation (13). And then, by using the weighting coefficient in which the set optimal direction angle is substituted for the above equation (13), each RPRM signal corresponding to each higher mode is obtained. In this case, each direction angle is optimized; therefore, each necessary RPRM signal may be one kind.

Figure 14A:
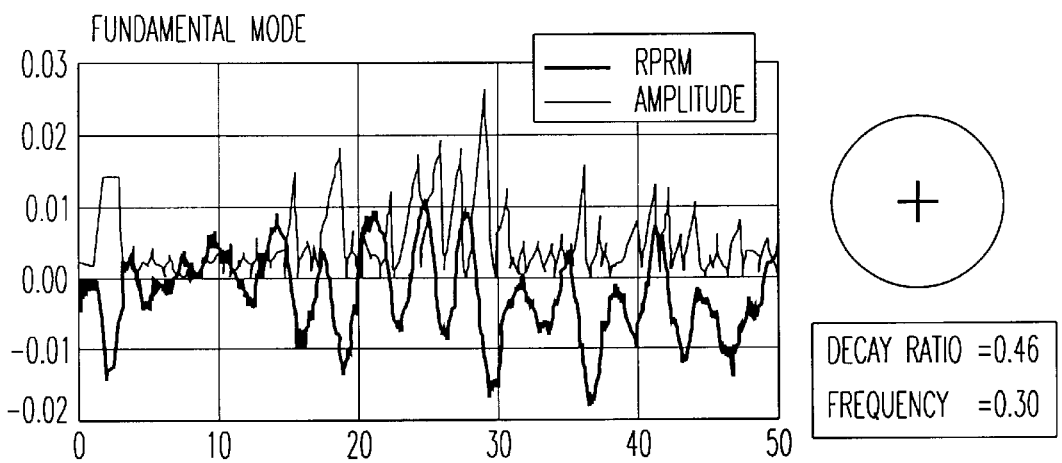
FIG. 14 is a view showing an example of monitoring each mode component including a decay ratio, a natural frequency and an RPRM signal generating wave form in the system according to the embodiment of the present invention.
Figure 14B:
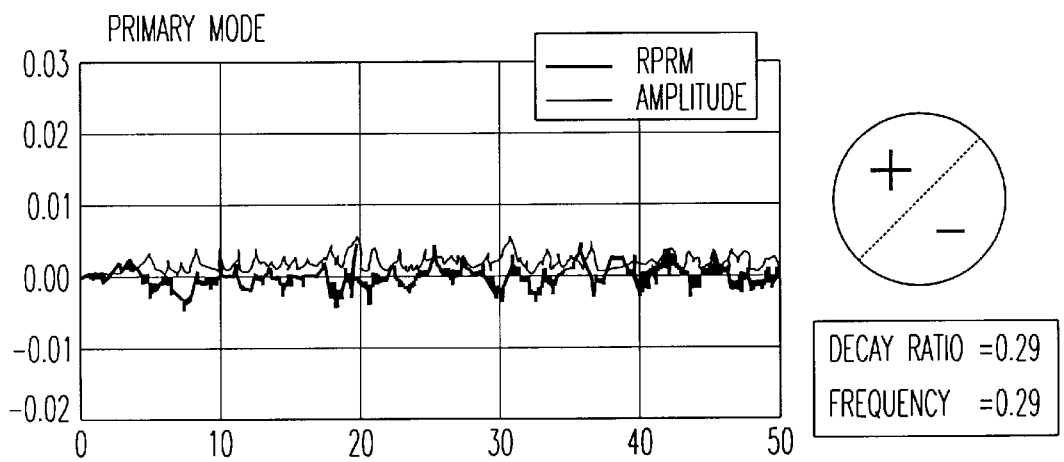
Figure 14C:
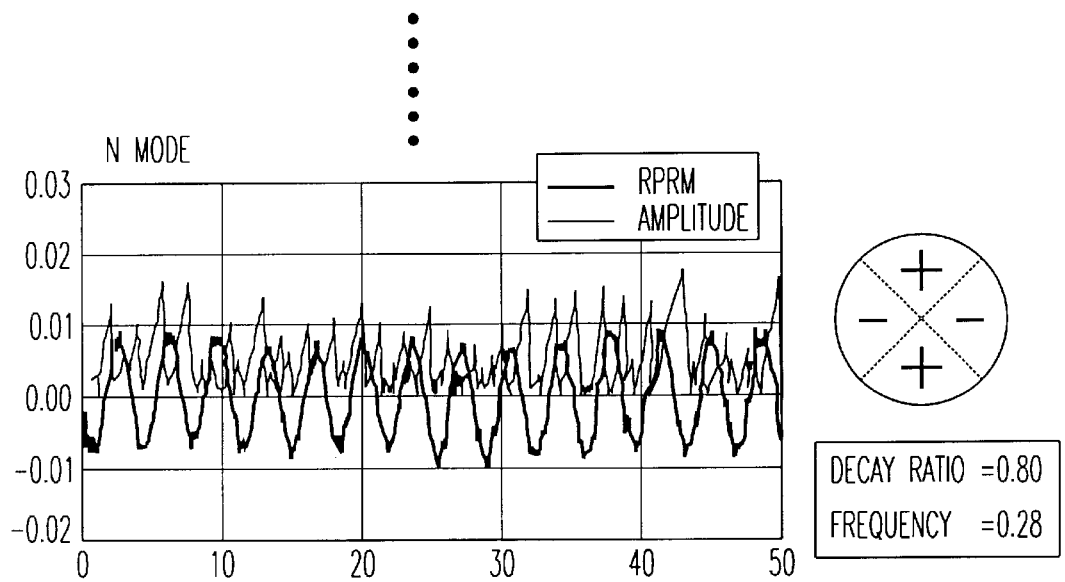

The obtained each RPRM signal has time information of each higher mode; therefore, stability monitoring parameters such as the decay ratio, the amplitude and the period are extracted from each RPRM signal. FIG. 14 shows monitoring examples.

In FIG. 14, there are shown monitoring examples of b1 displaying various parameters on each mode of the fundamental mods to the arbitrary higher mode (N mode) on the basis of the aforesaid method.

The parameters includes the direction (upper right side in the figure) of each RPRM signal, the decay ratio thereof and the period (frequency) (lower right side therein) thereof, and the response wave form thereof, said each RPRM signal representing to time responses of each mode.

In this example, the fundamental mode component, that is, the core-wide oscillation component is a principal component, and for instance, the primary order component is slightly contained. Further, a higher mode component, such as N mode component, other than the primary mode component is contained, and it can be soon that the decay ratio of the higher mode (N mode) component is higher.

Figure 15A:
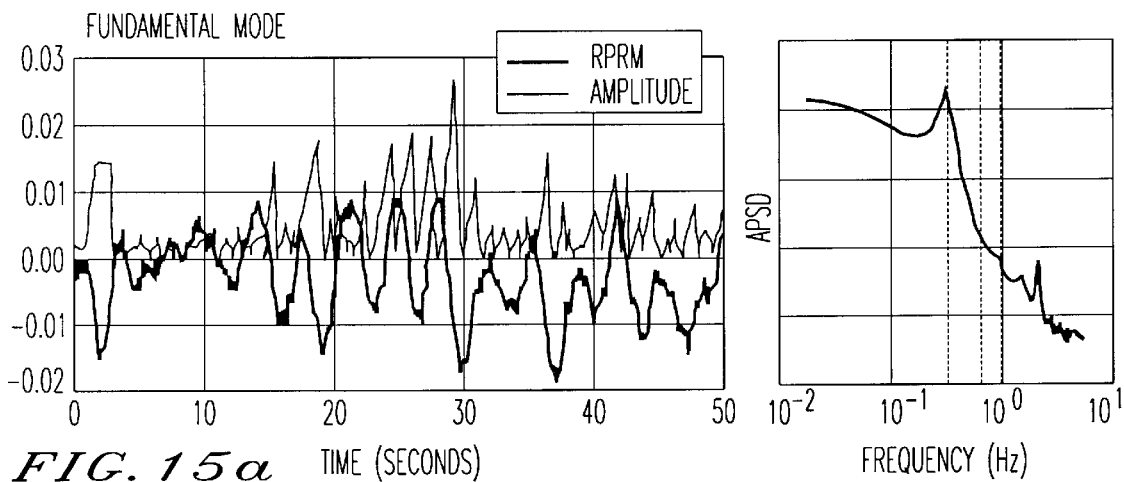
FIG. 15 is a view showing a higher mode spectrum monitoring example for monitoring each higher mode component in the light of a monitoring signal generating wave form and its amplitude and a spectrum of the monitoring signal in the reactor power monitoring system according to the present invention.
Figure 15B:
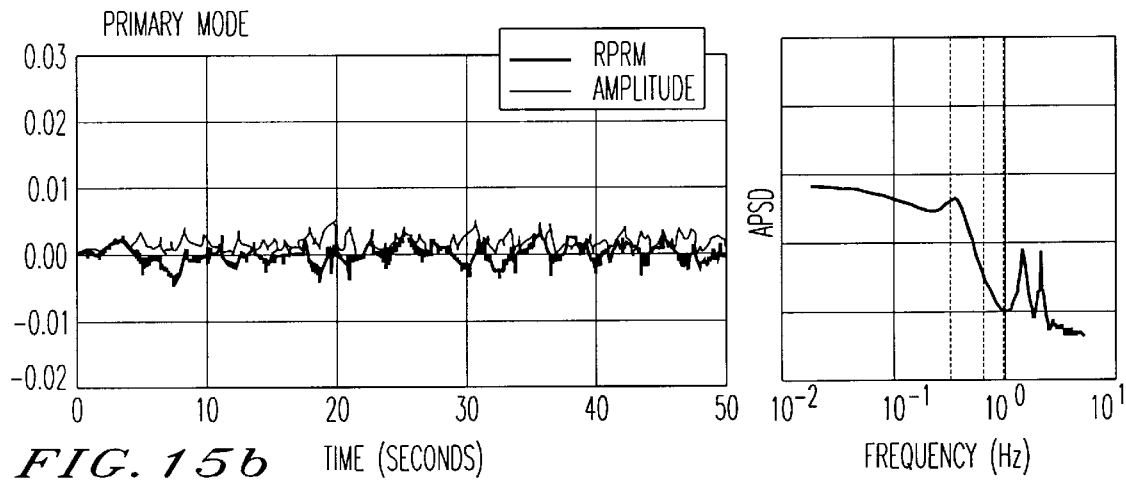
Figure 15C:
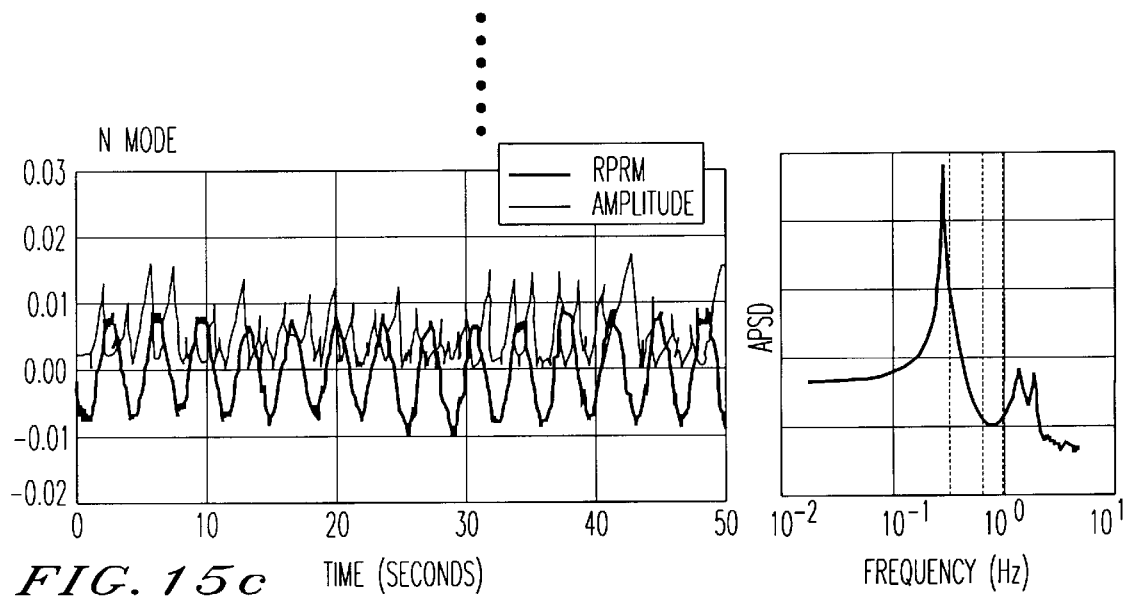

A spectrum of each RPRM signal is recited as another one monitoring item. FIG. 15 shows examples of displaying the response wave form, the amplitude, and the spectrum (self power spectrum density: APSD) of each RPRM signal.

It is possible to determine the stability of each mode on the basis of a peak height of the APSD and the sharpness thereof. Further, it is possible to determine whether the mode component dominantly develops as the oscillation according to the result whether or not the peak, that is, the higher harmonic peak appears on a position of an integer times with respect to a reference frequency or tie spectrum.

Figure 16:
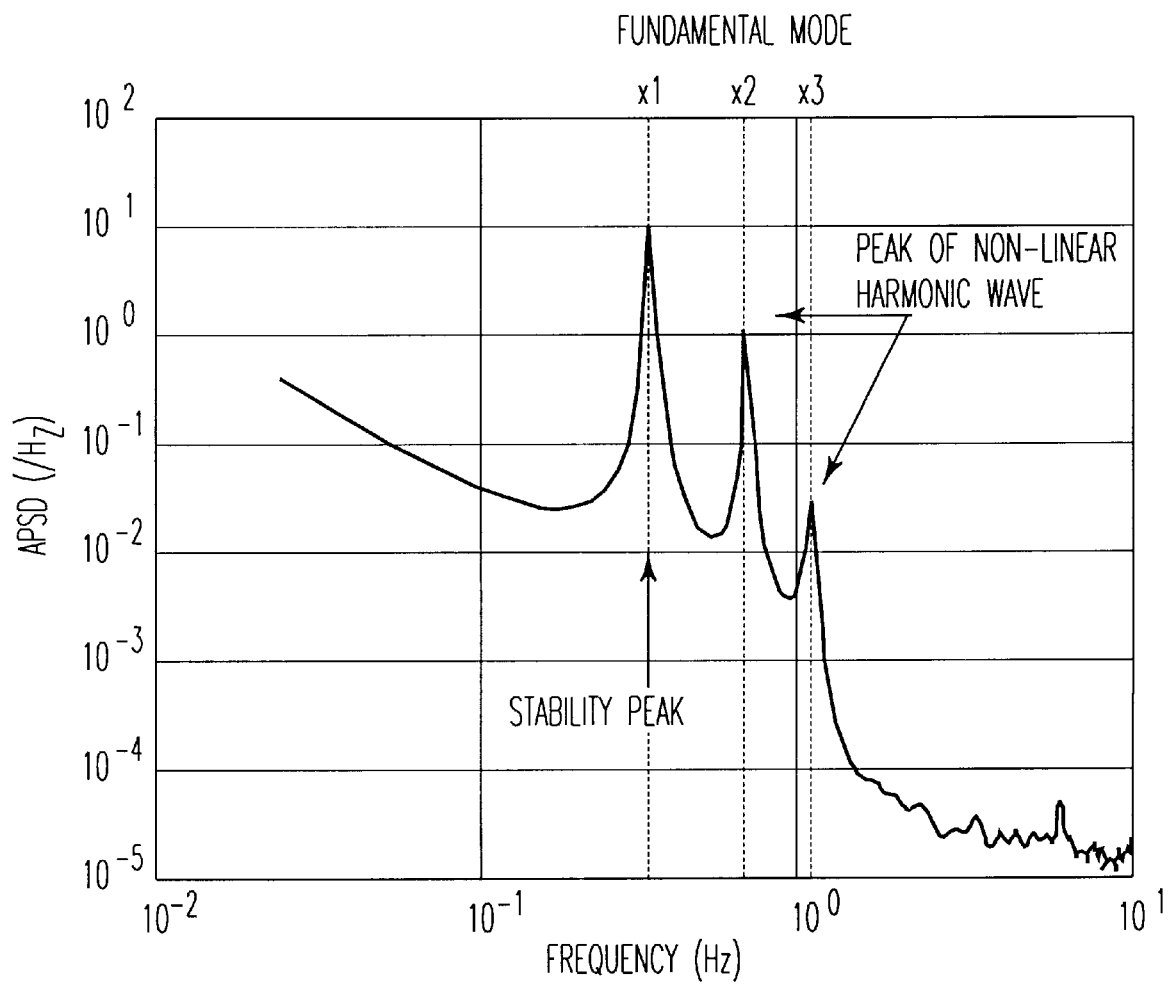
FIG. 16 is a view showing a peak of a higher harmonic wave appearing in a spectrum of a developed oscillation in the system according to the embodiment of the present invention.

FIG. 16 shows the APSD of the RPRM signal in a developing power oscillation, and there clearly appears in the higher harmonic wave has a frequency two or three times as much as the reference frequency (about 0.35 Hz). However, no higher harmonic wave appears in the spectrum shown in FIG. 15 (in this case, 1 Hz or more peak results from other reasons having no relation with stability).

Therefore, in the example, the relatively high decay ratio is shown, and also, the higher mode component is contained. However, in the amplitude, the value between peaks is 3% at the most, and the amplitude does not contain a non-linear higher harmonic component which remarkably appears at the point of time when the stability becomes worse and then oscillation is generated. Therefore, it can be seen that the core 12 is relatively stable as a whole, and is not a state of taking care of safety in particular. Monitoring may be principally made with respect to the fundamental mode component having the largest amplitude and the N mode component in which the stability becomes worse.

In this embodiment, the monitoring operation is carried out with the use of all LPRM signals usable in the core 12. Thus, changing components of these signals are three-dimensionally displayed in real time, and thereby, it is possible to visually grasp the spatial oscillation.

For example, assuming that i-th LPRM signal is set as LPRM i(t) which is A/D-converted and from which a trend component and a higher harmonic noise component are removed by means of a band-pass filtering operation, and an average value of the LPRM i(t) at an arbitrary interval is set as $\overline{LPRM_i}$, the following standard deviation (14) is obtained.

$$X_i(t) = \frac{LPRM_i(t) - \overline{LPRM_i}}{\overline{LPRM_i}} \quad (14)$$

Figure 17:
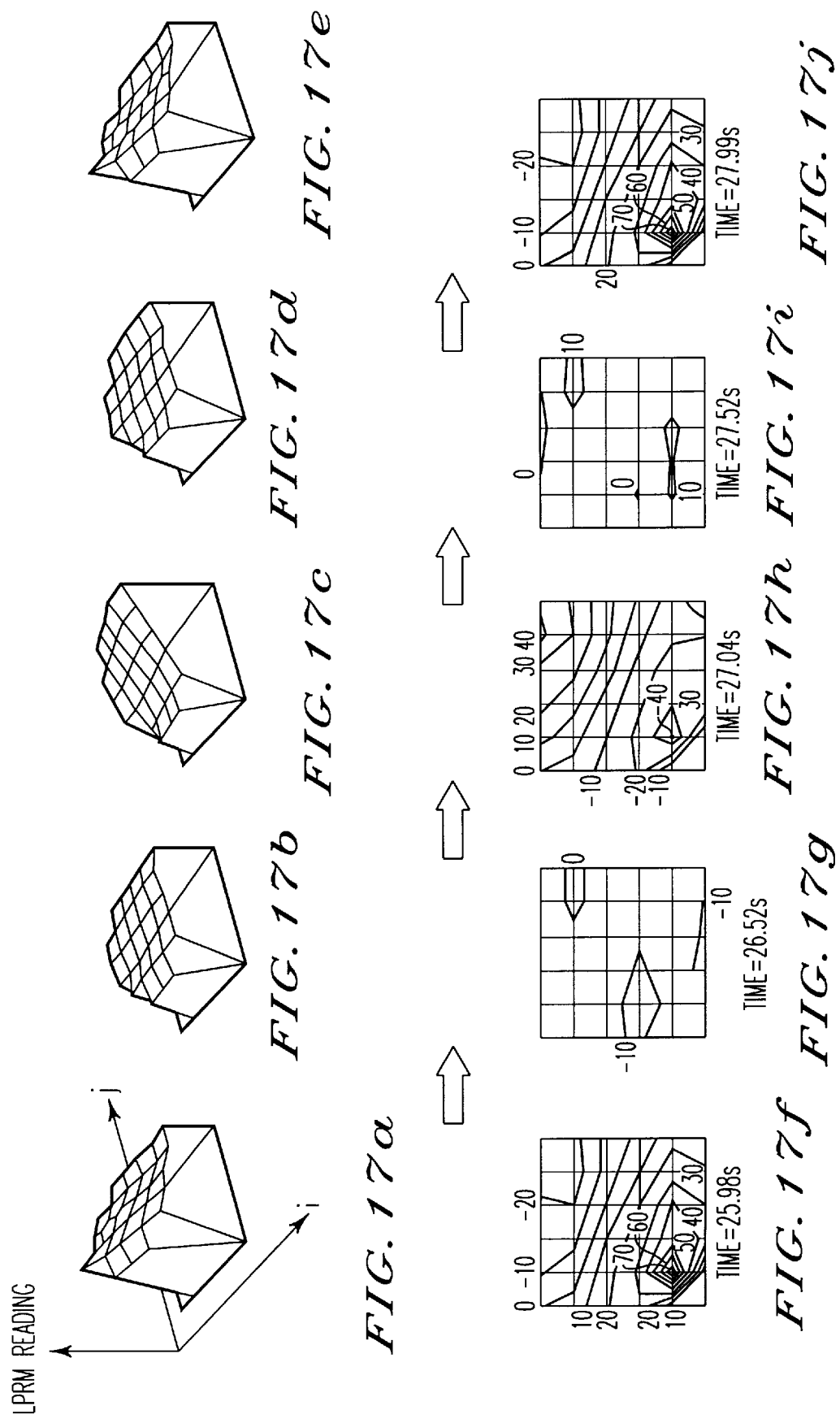
FIG. 17, as an example of displaying on a three-dimensional coordinates an oscillation of standardized LPRM signals in the system according to the embodiment of the present invention, is a view showing a successively displayed animation of the oscillation of the standardized LPRM signals on positions corresponding to an arrangement of each LPRM detector in the reactor core.

In this manner, these oscillations are three-dimensionally displayed in real time on a display screen of the display unit 22 in accordance with the arrangement of the neutron flux measuring devices 13 (neutron flux detectors 15) located in the core 12. FIG. 17 shows an example of the display.

In this case, one resonant frequency is shown every about two seconds. Actually, a solid figure as shown in FIG. 17 is displayed in real time as animation. Further, in the lower side of FIG. 17, there is shown a contour line diagram of each LPRM signal. If a displaying color varies in accordance with each value of each amplitude, it is possible to readily grasp a spatial behavior of the power oscillation in the core 12.

Moreover, in place of the LPRM signal, by using the RPRM signals which are, corrected by the optimized weighting coefficients in the above equation (13), it is possible to display the oscillations of the higher mode components used as the weighting coefficients like animation.

The aforesaid description is the method of monitoring the regional stability with the use of all or most of LPRM signals arranged in the core 12. Next, the following is a description on a method of readily monitoring the regional stability with the use of limited LPRM signals.

For example, also shown in FIG. 6, the circumferential primary mode has a higher distribution in the peripheral portion of the core 12; for this reason, it is considered that a contribution to LPRM signals of the center portion of the core 12 of the higher mode relative to the regional stability is smaller than the peripheral portion of the core 12. Therefore, in the case of monitoring the core stability using the APRM signals as the conventional case, only LPRM signals arranged in the peripheral portions of the core 12 may be used to monitor the regional stability Further, by using LPRM signals from the devices 13 (LPRM detectors 15) located with a distance substantially equal from the center of the core 12, the approximately same value is used as the weighting coefficient.

Figure 18:
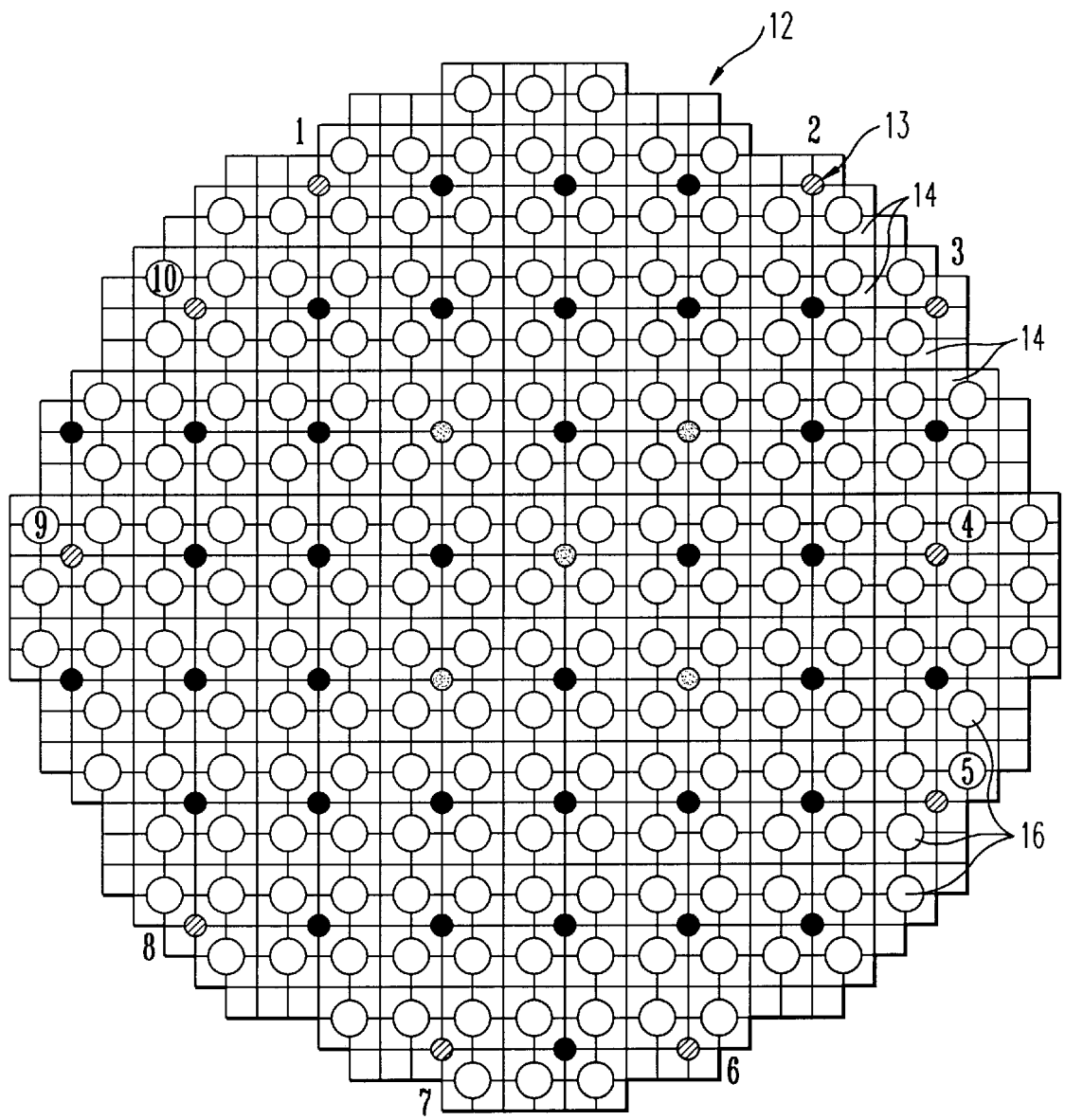
FIG. 18 is a view showing an arrangement of the LPRM signal detectors for readily monitoring the core stability of the reactor core according to the embodiment of the present invention.

FIG. 18 shows the arrangement of the LPRM signal measuring devices for readily monitoring the core stability with the use of the limited LPRM signals. In this arrangement example, 15 LPRM signals are used in total; more specifically, five LPRM signals in the center portion of the core 12 is used for monitoring the core stability, and ten LPRM signals in the peripheral portions of the core 12 are used for monitoring the regional stability. Further, a value 0.2 is uniformly used as the signal weight coefficient for monitoring the core stability, and a value ±0.2 is uniformly used as the signal weight coefficient for monitoring the regional stability.

For example, in the LPRM signals (1~10) for monitoring the regional stability in FIG. 18, the LPRM signals (3~7) using the value 0.2 of the weighting coefficient and the LPRM signals (8~2) using the value −0.2 as the weighting coefficient are set as the RPRM1 . and the LPRM signals (1~5) using the value 0.2 of the weighting coefficient and the LPRM signals (6~10) using the value −0.2 as the weighting coefficient are set as the RPRM2. Bach LPRM signal is standardized by a DC (direct current) value of each LPRM signal. By standardization, the uniform value to used as the weighting coefficients, and a deviation component is extracted from the each DC value of each RPRM signal.

Figure 20:
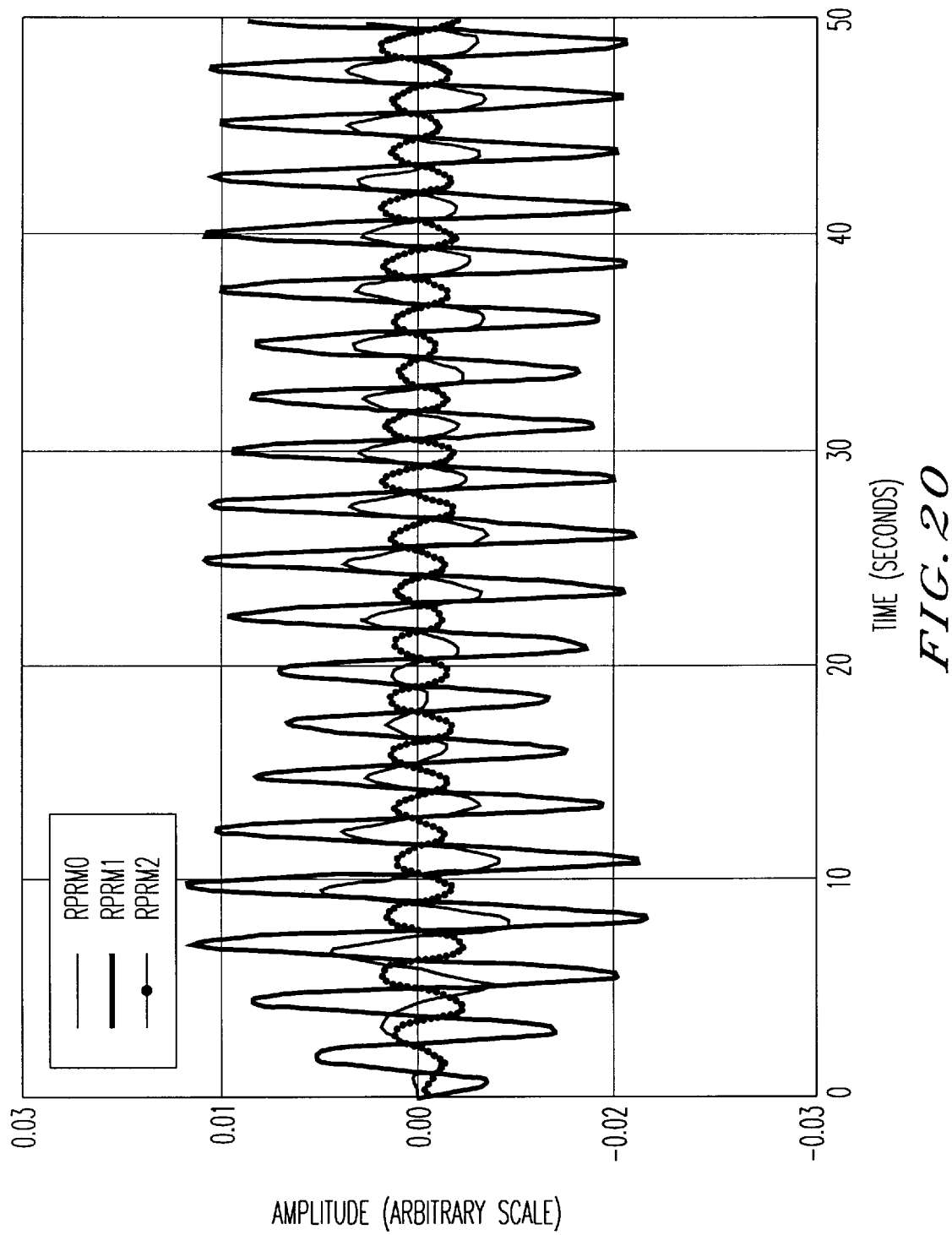
FIG. 20 is a view showing a result in a case of readily monitoring the core stability of the reactor core of the system applied to the regional oscillation according to the embodiment of the present invention.

FIG. 19 shows an example of readily monitoring the core stability with the use of the limited LPRM signals, and FIG. 20 shows an example of readily monitoring the regional stability with the use of the limited LPRM signals.

These FIG. 19 and FIG. 20 shown respective responses of the RPRM0 (corresponding to the fundamental mode, core stability monitoring signal) and the RPRM1/2 (corresponding to the circumferential primary mode, regional stability monitoring signal) obtained, in a case of simulating an oscillation phenomenon with the use of a three-dimension stability analysis code, by filtering the LPRM signals gained by the oscillation phenomenon through the weighting coefficients proposed in the present invention. Since, in the core-wide oscillation, the amplitude of RPRM0 signal is dominant, and in the case of the regional oscillation, either RPRM1 signal or RPRM2 signal is dominant, the stability of the core 12 is monitored similar to the whole LPRM signals. Since, in the case of using the limited LPRM signals, one mode of the oscillation may be influenced by other mode of the oscillation, it is difficult to monitor each mode of the oscillation by only using the decay ratio. Therefore, it needs to evaluate not only the decay ration but also the amplitude.

The aforesaid description relates to the method of successively monitoring the stability of the core 12 on the basis of the LPRM data which are time series data. Further, a stability predicting operation will be explained below on the basis of the physical model.

Figure 21:
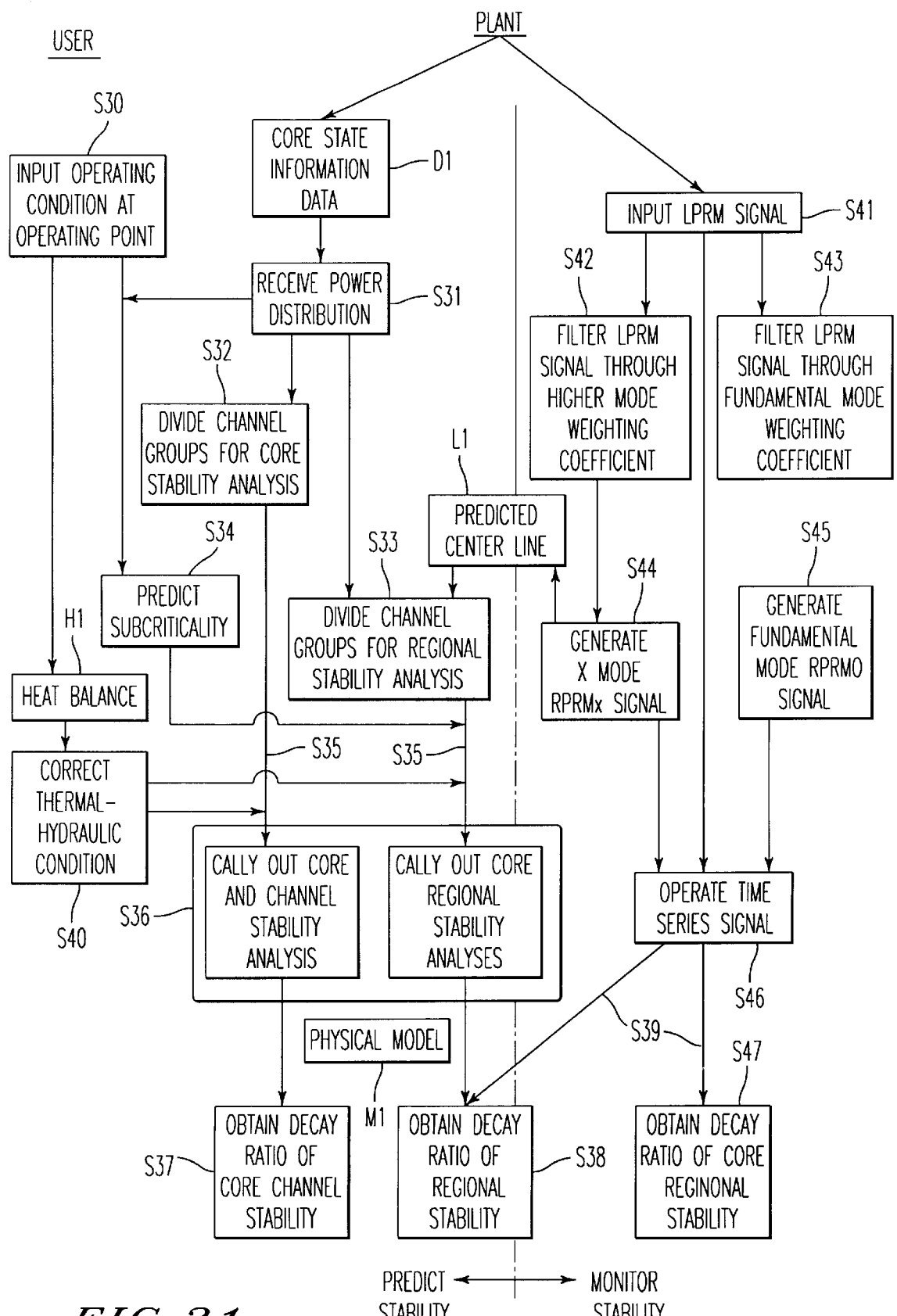
FIG. 21 is a schematically flow chart showing procedures of a stability predicting operation and procedures of a successively stability monitoring operation in the system according to the embodiment of the present invention.

First, FIG. 21 shows a flow of computation of the stability predicting operation while comparing a flow of computation for monitoring the stability. In the case where the operator predicts a stability in an arbitrary (given) operating point having a predetermined operating condition, the operator (user) inputs the operating conditions (power and flow rate of the coolant) for predicting the stability at the operating point, referred to Step S30. The stability predicting unit 21 accesses to the updated core state information data (referred to D1) recorded in the process computer 19 at the inputting point of time so as to receive the power distribution, referred to step S31. A fuel assembly having the highest power is selected according to the power distribution by the predicting unit 21, and then, is determined as a fuel assembly for obtaining the channel stability by the predicting unit 21. Next, in accordance with the power distribution, some fuel assemblies having a thermal-hydraulically clogs condition are collected so as to form several divided channel groups for the core stability analysis, referred to step S32.

Likewise, several divided channel groups for regional stability analysts are formed on the basis of the predicted center line of the oscillation (referred to L1) and the higher mode weight coefficient (second weighting coefficient) obtained from the power distribution and the stability monitoring operation, referred to step S33.

Moreover, in the regional stability analysis, the subcriticality of the higher mode is required. However, in a current core monitoring system, an evaluation of the higher mode is not carried out; therefore, the subcriticality of the higher mode it previously determined as a function G of the power distribution, and is computed so as to be predicted with the use of the power distribution obtained from the monitoring system, referred to step S34.

The following is procedures for obtaining the subcriticality of the higher modes. That is, the power distribution of a certain fuel assembly is set as $Pr_n$ so as to obtain a mean square R of the next power distribution.

$$R = \frac{\sum_{n=1}^{N} N_n Pr_n^2}{\sum_{n=1}^{N} N_n} \quad (15)$$

where, $N_n$ is the number of fuel assemblies included in a channel group n.

Likewise, a mean square RL with respect to a distance from the center of the core 12 of the certain fuel assembly in determined.

$$RL = \frac{\sum_{n=1}^{N} N_n L_n Pr_n^2}{\sum_{n=1}^{N} N_n L_n} \quad (16)$$

where, $L_n$ is a distance from the center of the core 12 of the certain fuel assembly.

The subcriticality is expressed as a function of a difference between the above two indexes R, RL.

Further, a function H of operating conditions (power P, flow rate of coolant F) is previously set as a subcriticality with respect to the operating condition for predicting the stability of the operating point.

Thus, the subcriticality Δρ with respect to the operating condition for predicting the stability is obtained from the following equation (17).

$$\Delta\rho = G(R-RL)H(P,F) \quad (17)$$

Bedsides, variables which vary depending upon the operating conditions, for example, a bypass flow rate, a channel axial direction a power distribution of a channel axial direction and the like are previously set as a function of the operating condition, and a variable value at the predicted operating is set on the basis of a deviation between the operating condition provided by the core the core state information data and the operating condition for predicting the stability. Further, another variable value which is estimated from the operating condition with the use of a steady heat balance, for example, a core pressure, a core inlet temperature and the like are computed and set from a physical model corresponding to the heat balance (referred to H1). As described above, the thermal-hydraulic conditions including the number of the channel division, the value or the subcriticality and the value of the power distribution in the predicted operating state are determined, and thereafter, these values of the thermal-hydraulic conditions are captured by the predicting unit 21 to the stability analysis physical model (referred to M1), referred to step S35 so that the analyses of the core stability, the channel stability and the regional stability are carried out, respectively, referred to step S36 and thus, the decay ratios and the natural frequencies (resonant frequency) of the core and channel stability are computed by the predicting unit 21, referred to stop S37 and the decay ratio and the resonant frequency of the regional stability are computed thereby, referred to step S38. As shown in FIG. 21, the predicting model can use a stability information including the core state information data, referred to step S39, always obtained from the plant, such as the nuclear reactor 10; therefore, in the predicting operation, it is possible to perform learning operation so as to correct a bias concerning (referred to step S40) the thermal-hydraulic conditions between the monitored stability obtained from plant time series data including the LPRM data and the core state data by monitoring operation referred to steps S41~S47 substantially corresponding to the steps S25a~S25d, and the steps S26a~S26g shown in FIG. 4, and the predicted stability obtained from the predicting operation. The data considered as an adjusting parameter by the learning operation includes the following data related to the thermal-hydraulic conditions, more specifically, the power distribution and a void reactivity coefficient in the core/range stability, a transfer characteristic of the re-circulation system in the core stability alone, and the subcriticality of the higher mode in the regional stability. For example, in the case where the predicting operation is clearly started as by the user, and in the ocean where the operating state varies from the current operating point in come degree due to the operating conditions or excessive phenomenon, the stability monitoring operation and the stability predicting operation are automatically started up, and thereby, the learning operation is carried out with some frequency. The void reactivity coefficient is the parameter affective in both the core stability and the regional stability. However, the transfer characteristic of the re-circulation system is the parameter effective in the only core stability, and the subcriticality is the parameter effective in the only regional stability. For this reason, first, adjustment learning operation in both the core and regional stability is carried out on the basis of the void reactivity coefficient, and thereafter, adjustment learning operation in the core stability is carried out on the basis of the transfer characteristic of the re-circulation system, and then, adjustment learning operation in the regional stability is carried out on the basis of the sub-criticality. The aforesaid learning operation is realized by the stability predicting unit 21 shown in FIG. 4.

In the present invention, the newly monitoring signals are obtained with the use of the weighting coefficients taking the fundamental mode of the neutron flux distribution and the higher mode distribution into consideration, and then, the decay ratio, the amplitude and the phase relationship are obtained from the signal responses on the basis of each weighting coefficient, and thus, it is possible to comprehensively and synthetically discriminate the spatial oscillation phenomenon generated in the reactor core 12. Further, the stability is predicted on the basis of the physical model with the use of the update core state information data, and thereby, it is possible to predict a change of the core stability when the operating state varies, making it enabled to achieve a more stable operation of the nuclear reactor 10.

In the monitoring system of this embodiment, it is possible to more accurately detect and discriminate the power oscillation which is hard to be detected by the conventional APRM signal obtained by making average the conventional analog signals. Therefore, safety and availability factor of the nuclear reactor 10 can be further improved.

While there has been particularly shown and described with reference to the preferred embodiment thereof, it will be understood by those skilled in the art that the foregoing and other changes in form and details can be made therein without departing from the spirit and scope of the present invention.

What is claimed is:

1. A system for monitoring power of a nuclear reactor, comprising:

a plurality of neutron flux measuring means arranged in a reactor core of the nuclear reactor for measuring neutron flux so as to generate neutron flux signals on the basis of the measured neutron flux;

generating means having a first weighting coefficient and a second weighting coefficient for filtering the neutron flux signals using the first weighting coefficient and the second weighting coefficient so as to generate a stability monitoring signal, said first weighting coefficient corresponding to a fundamental mode of a neutron flux distribution in the reactor core and said second weighting coefficient corresponding to a higher mode of the neutron flux distribution in the reactor core; and stability monitoring means for monitoring a stability of the reactor core according to the stability monitoring signal generated by the generating means.

2. The system according to claim 1, wherein said reactor core is homogeneous, and said first weighting coefficient and said second weighting coefficient are obtained by using a Bessel function distribution substantially corresponding to a neutron flux distribution of the homogeneous reactor core.

3. The system according to claim 2, wherein said fundamental mode of the neutron flux distribution corresponds to a zero-order of the Bessel function distribution, and said higher mode of the neutron flux distribution corresponds to a higher-order of the Bessel function distribution.

4. The system according to claim 3, wherein said higher mode of the neutron flux distribution corresponds to regional oscillations of the neutron flux in the reactor core, and said fundamental mode of the neutron flux distribution corresponds to oscillations of the neutron flux together with the reactor core therein.

5. The system according to claim 1, wherein said generating means is adapted to generate a first stability monitoring signal as the stability monitoring signal by filtering the neutron flux signals through the first weighting coefficient so as to supply the first stability monitoring signal to the stability monitoring means, and said stability monitoring means comprises:
means for determining a decay ratio based on the first stability monitoring signal, and a resonant frequency and an amplitude of said first stability monitoring signal, and means for evaluating a core stability of the reactor core as the stability thereof based on the decay ratio, the resonant frequency and the amplitude.

6. The system according to claim 1, wherein said generating means is adapted to generate a second stability monitoring signal as the stability monitoring signal by filtering the neutron flux signals through the second weighting coefficient so as to supply the second stability monitoring signal to the stability monitoring means, and said stability monitoring means comprises:
means for determining a decay ratio based on the second stability monitoring signal, and a resonant frequency and an amplitude of said second stability monitoring signal, and means for evaluating a regional stability of the reactor core as the stability thereof on the basis of the decay ratio, the resonant frequency and the amplitude.

7. The system according to claim 1, wherein said second weighting coefficient consists of two weighting coefficients orthogonal to each other, said generating means is adapted to generate two kinds of stability monitoring signals as the stability monitoring signal by filtering the neutron flux signals through the respective two weighting coefficients so as to supply the two stability monitoring signals to the stability monitoring means, and said stability monitoring means comprises:
means for determining decay ratios based on the two stability monitoring signals, and corresponding resonant frequencies and amplitudes of said two stability monitoring signal, respectively, and means for evaluating a regional stability of the reactor core as the stability thereof on the basis of the decay ratios, the resonant frequencies and the amplitudes.

8. The system according to claim 7, wherein said stability monitoring means comprises:

means for evaluating the two weighting coefficients on a phase plane based on the two stability monitoring signals so as to determine a difference between the amplitudes of the two stability monitoring signals on the phase plane, and means for estimating an oscillating direction of a regional oscillation in the reactor core according to the difference therebetween, wherein said regional oscillation is based on the two kinds of the stability monitoring signals.

9. The system according to claim 1, wherein said second weighting coefficient consists of two weighting coefficients orthogonal to each other, said generating means is adapted to generate the first and the two stability monitoring signals as the stability monitoring signal by filtering the neutron flux signals through the first and the two weighting coefficients so as to supply the first and the two stability monitoring signals to the stability monitoring means, respectively, said stability monitoring means comprises:
means for determining decay ratios based on the first and the two stability monitoring signals, and corresponding ones of resonant frequencies and amplitudes of said first two stability monitoring signals, respectively, wherein, in a case where the amplitudes of the two stability monitoring signals are substantially equal to each other, said stability monitoring means compares the amplitude of the first stability monitoring signal to the amplitude of one of the two stability monitoring signals so as to determine whether an oscillation in the core concerning to the first and the two stability monitoring signals is subjected to a core oscillation based on the first stability monitoring signal in the reactor core or a regional oscillation based on the two stability monitoring signals therein.

10. The system according to claim 1, wherein said generating means comprises:

means adapted to rotate the first and second weighting coefficients along first and second direction angles, respectively, said first direction angle is an angle of a border line changing a positive and negative sign of the first weighting coefficient,, and said second direction angle is an angle of a border line changing a positive and negative sign of the second weighting coefficient, and means adapted to estimate an oscillating direction of the fundamental mode of the neutron flux distribution based on a response amplitude based on the first direction angle and to estimate an oscillating direction of the higher mode of the neutron flux distribution based on a response amplitude based on the second direction angle.

11. The system according to claim 10, wherein said generating means is adapted to determine an optimal first weighting coefficient based on the first weighting coefficient and the first direction angle of the fundamental mode osciating direction and to determine an optimal second weighting coefficient based on the second weighting coefficient and the second direction angle of the higher mode oscillating direction, and adapted to filter the neutron flux signals through the optimal first weighting coefficient and the optimal second weighting coefficient, thereby generating the first stability monitoring signal and the second stability monitoring signal, and said stability monitoring means is adapted to determine decay ratios based on the first and second stability monitoring signals, and corresponding resonant frequencies and amplitudes of said fist and second stability monitoring signals, respectively, thereby evaluating a core stability of the reactor core and a regional stability of the reactor core based on the decay ratios, the resonant frequencies and the amplitudes.

12. The system according to claim 11, wherein said stability monitoring means comprises:

means for obtaining a first spectrum density of the first stability monitoring signal based thereon and a second spectrum density of the second stability monitoring signal based thereon, means for checking whether or not a higher harmonic wave component equivalent to an integer times as much as a fundamental frequency of the first spectrum density is included therein and for checking whether or not a higher harmonic wave component equivalent to an integer times as much as a fundamental frequency of the second spectrum density is included therein, and means for evaluating a contribution of the fundamental mode of the neutron flux distribution and the higher mode thereof with respect to the core stability of the reactor core and the regional stability thereof.

13. The system according to claim 12, further comprising:

means for displaying the decay ratios, the resonant frequencies and the amplitudes of the first and second stability monitoring signals and for displaying responses of the first and second stability monitoring signals.

14. The system according to claim 13, wherein said stability monitoring means comprises:

means for smoothing the neutron flux signals from the neutron flux measuring means arranged in the reactor core so as to obtain fluctuation components of the neutron flux signals, wherein said display means is adapted to successively display the fluctuation components as animations on three-dimensional coordinates based on the arrangement of the neutron flux measuring means in the reactor core so as to evaluate spatial fluctuations of the power of the reactor core therein.

15. The system according to claim 13, wherein said stability monitoring means comprises:

means for smoothing the neutron flux signals from the neutron flux measuring means arranged in the reactor core so as to obtain fluctuation components of the neutron flux signals, and means for multiplying the fluctuation components by the optimal first and second weighting coefficients, respectively, so as to obtain fluctuations of the higher mode, wherein said display means is adapted to successively display the fluctuations of the higher mode as animations on three-dimensional coordinates based on the arrangement of the neutron flux measuring ideas in the reactor core so as to evaluate the spatial fluctuations of the higher mode in the reactor core.

16. A system for monitoring power of a nuclear reactor, comprising:

a plurality of neutron flux measuring means arranged in a reactor core of the nuclear reactor for measuring neutron flux so as to generate neutron flux signals on the basis of the measured neutron flux, a part of said neutron flux measuring means being disposed on peripheral portions of the reactor core so as to be substantially at equal distance from a center portion of the reactor core;

generating means having at least one weighting coefficient for filtering the neutron flux signals through the at least one weighting coefficient so as to generate a stability monitoring signal; and stability monitoring means for monitoring a regional stability of the reactor core based on the stability monitoring signal generated by the generating means.

17. The system according to claim 16, wherein said at least one weighting coefficient includes a plurality of weighting coefficients, one half of said plurality of weighting coefficients have a predetermined absolute value and a positive sign, another half of said plurality of weighting coefficients have an absolute value equal to the predetermined absolute value and a negative sign, said generating means is adapted to standardize the neutron flux signals based on current values thereof, respectively, and to filter the standardized neutron flux signals through the weighting coefficients so as to generate stability monitoring signals, respectively, and said stability monitoring means comprises:

means for determining decay ratios based on the stability monitoring signals, and corresponding resonant frequencies and amplitudes of said stability monitoring signals, and means for evaluating a regional stability of the reactor core based on the decay ratios, the resonant frequencies and the amplitudes.

18. The system according to claim 16, wherein said at least one weighting coefficient comprises two weighting coefficients, each having a center line changing a positive and negative sign thereof, said center line of one of the two weighting coefficients being orthogonal to the center line of other of the two weighting coefficients, said generating means is adapted to filter the neutron flux signals through the two weighting coefficients so as to generate stability monitoring signals, respectively, and said stability monitoring means comprises:

means for determining decay ratios based on the stability monitoring signals, and corresponding resonant frequencies and amplitudes of said stability monitoring signals, and means for evaluating the regional stability of the reactor core based on the decay ratios, the resonant frequencies and the amplitudes.

19. The system according to claim 1, further comprising:

measuring and recording means for successively measuring core state data representing a present state in the reactor core based on the neutron flux signals so as to record the core state data;

input means for inputting a given operating point of the nuclear reactor having a predetermined operating condition thereof;

means for reading out the core state data from the measuring and recording means in response to the input of the given operating point;

means for obtaining a thermal-hydraulic prediction condition at the given operating point on the basis of the predetermined operating condition and the read-out core state data; and stability predicting means having a stability analysis model based on a physical model for carrying out a stability analysis by using the thermal-hydraulic prediction condition at the given operating point and the stability analysts model so as to predict a core stability, a channel stability and a regional stability of the reactor core at the given operating point.

20. The system according to claim 19, wherein said thermal-hydraulic prediction condition includes a parameter varying based on a change of the operating point and having no physical model, said parameter is previously set as a function based on the operating condition, and said obtaining means comprises:
means for calculating a deviation between the parameter of the predetermined condition of the given operating point and an operating condition provided by the read-out core state data so as to determine a variable value included in the thermal-hydraulic prediction condition at the given operating point on the basis of the calculated deviation.

21. The system according to claim 20, wherein said generating means is adapted to generate first and second stability monitoring signals as the stability monitoring signal by filtering the neutron flux signals through the first and second weighting coefficients so as to supply the first and second stability monitoring signals to the stability monitoring means, respectively, said stability monitoring means comprises:
means for determining decay ratios based on the first and second stability monitoring signals, and corresponding resonant frequencies and amplitudes of said first and second stability monitoring signals, respectively, and means for evaluating a core stability of the reactor core as the stability thereof and a regional stability of the reactor core as the stability thereof on the basis of the decay ratios, the resonant frequencies and the amplitudes, wherein said stability predicting means comprises:
means for comparing the core stability and the regional stability predicted thereby, and the core stability and the regional stability monitored by the stability monitoring means so as to obtain a bias between the predicted core and regional stability and the monitored core and regional stability, and means for carrying out a learning adjustment of the predicted core and regional stability based on the obtained bias, whereby the predicted core and regional stability substantially is based on the monitored core and regional stability.

22. The system according to claim 1, wherein:

said fundamental mode corresponds to core-wide stability of said reactor core; and said higher mode corresponds to regional stability of said reactor core.

23. The system according to claim 22, wherein:

said fundamental mode corresponds to only a zero-order of a Bessel function approximation of said neutron flux distribution; and said higher mode corresponds to only a first-order of said Bessel function approximation of said neutron flux distribution.

24. The system according to claim 1, wherein:

said fundamental mode corresponds to only a zero-order of a Bessel function approximation of said neutron flux distribution; and said higher mode corresponds to only a first-order of said Bessel function approximation of said neutron flux distribution.

* * * * *